(12) United States Patent
Holbrook et al.

(10) Patent No.: US 11,552,887 B2
(45) Date of Patent: Jan. 10, 2023

(54) SYSTEM AND METHOD OF PROCESSING PACKET CLASSIFICATION WITH RANGE SETS

(71) Applicant: Arista Networks, Inc., Santa Clara, CA (US)

(72) Inventors: Hugh W. Holbrook, Palo Alto, CA (US); Francois Labonte, Menlo Park, CA (US); Ramakrishna Shivaramaiah Paduvalli, San Jose, CA (US); Xuanran Zong, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 113 days.

(21) Appl. No.: 16/986,982

(22) Filed: Aug. 6, 2020

(65) Prior Publication Data
US 2021/0044521 A1 Feb. 11, 2021

Related U.S. Application Data

(60) Provisional application No. 62/884,054, filed on Aug. 7, 2019.

(51) Int. Cl.
*H04L 45/50* (2022.01)
*G06K 9/62* (2022.01)
(Continued)

(52) U.S. Cl.
CPC .......... *H04L 45/507* (2013.01); *G06K 9/6215* (2013.01); *H04L 45/745* (2013.01); *H04L 47/2441* (2013.01)

(58) Field of Classification Search
None
See application file for complete search history.

(56) References Cited

U.S. PATENT DOCUMENTS

2002/0191605 A1* 12/2002 Lunteren ................. H04L 47/20
370/389
2006/0221954 A1* 10/2006 Narayan ............... H04L 45/306
370/389

(Continued)

FOREIGN PATENT DOCUMENTS

CN 108011823 A * 5/2018 ........... H04L 45/745

OTHER PUBLICATIONS

Taylor et al.; Scalable Packet Classification using Distributed Crossproducting of Field Labels; IEEE Infocom 2005 (Year: 2005).*

*Primary Examiner* — The Hy Nguyen
(74) *Attorney, Agent, or Firm* — Fountainhead Law Group P.C.

(57) ABSTRACT

A method and apparatus of a network element that processes network data using a transformed packet classification list in a network element is described. A network element receives a packet classification list and transforms a first set of the plurality of range sets corresponding to a first one of the two or more types of packet characteristics into a first set of range labels. In addition, the network element transforms a second set of the plurality of range sets corresponding to a second one of the two or more types of packet characteristics into a second set of range labels. The network element may create a set of combination labels. The network element further processes network data by performing a first lookup to derive a first combination packet label, performing a second lookup of at least the first combination packet label, and applying a rule resulting from the second lookup to the network data.

18 Claims, 20 Drawing Sheets

(51) Int. Cl.
*H04L 47/2441* (2022.01)
*H04L 45/745* (2022.01)

(56) References Cited

U.S. PATENT DOCUMENTS

| | | | |
|---|---|---|---|
| 2013/0166491 A1* | 6/2013 | Zhang | G06N 5/02 |
| | | | 706/47 |
| 2016/0182557 A1* | 6/2016 | Grzelak | H04L 63/101 |
| | | | 726/1 |
| 2016/0308766 A1* | 10/2016 | Register | H04L 43/028 |
| 2018/0124118 A1* | 5/2018 | Wu | H04L 43/026 |

* cited by examiner

SYSTEM AND METHOD OF PROCESSING PACKET CLASSIFICATION WITH RANGE SETS

CROSS-REFERENCE TO RELATED APPLICATIONS

This application claims the benefit of U.S. Provisional Patent Application No. 62/884,054, filed Aug. 7, 2019, which is hereby incorporated by reference in its entirety.

FIELD OF INVENTION

Embodiments relate generally to data networking and more particularly to performing packet classification with range sets.

BACKGROUND

A packet classification list consists of an ordered series of rules, where each rule has a match criterion and an action. A packet classification list is applied to a piece of data by evaluating the data against these rules in order and taking the action of the first rule that matched. For example, a match criterion for each rule is a pair (V, M), where V is a numeric value up to N bits long and M is a mask of N bits having a binary value of 0 or 1. A value X matches the rule if (X & M)==(V & M), where "&" is the bitwise "logical and" operator.

In one example, the values (X) matched against an Access Control List (ACL), a type of Packet Classification list, are Internet Protocol (IP) v4 or IPv6 addresses. In this example, the (V, M) pairs match subsets of the IPv4 or IPv6 address space, and the actions of an ACL are either "permit" or "deny". Also, each ACL can be terminated by an "implicit deny" rule at the end equivalent to "deny (0, 0)," which denies every address that is not explicitly covered by another preceding rule in the ACL. In another example, the IPv4 or IPv6 address are coupled with other fields associated with a packet to form the match criteria for a rule.

In addition, the match criteria for rules can be expressed in range set style filters that are more expressive than simple criteria described above by using sets of "fields." For example and in an embodiment, a field can be one or more of prefixes, ports, and/or other types of packet characteristics. The member elements of a range set are generally unordered, each member referring to some range of values or value of some field of or associated with a packet. For example:

TABLE 1

Sample packet classification list with rules that are prefix sets.

prefix-set foo
1.1.0.0/16
2.0.0.0/8
200.1.1.1/32
prefix-set bar
10.0.0.0/8
20.1.1.0/24
except 10.10.10.0/24
classifier acl1
10 action deny
ip-protocol tcp
src-prefix-set foo
src-port-set 1024-35019, 35041-65535
dst-prefix-set bar
dst-port-set 22, 53, 1024-65535
20 action permit TABLE 1-continued Sample packet classification list with rules that are prefix sets.

ip-protocol tcp
src-prefix-set foo
src-port-set 35000, 35010, 35020-35040
dst-prefix-set bar
dst-port-set 80, 123, 179, 30000-40000
dscp cs6, cs7

In rule 20 of the "acl 1" classifier in Table 1, foo and bar refer to range sets defined above, and the order of prefixes in these sets is not important. The "src-port-set" of 35000, 35010, 35020-35040 represents another range set.

The dst-port-set of 80,123,179,30000-40000 is another range set, and the "dscp" line that specifies cs6 and cs7 indicates another range set, defined "in-line" in the rule itself. In this example, a packet is considered to match the "10 action deny" rule of the "acl1" classification list if the packet is a TCP packet and if the fields associated with the packet match all of the range sets specified in the rule. A classification list may include many such rules, potentially thousands of them. It is desirable and useful in a network switch to efficiently match a set of packet characteristics derived from a packet, or a set of fields derived from some other piece of data against the rules in a classification list and determine the first matching rule, wherein the classification list contains large numbers of rules, wherein those rules may require evaluation of many range sets, and wherein each range set may contain many instances of field ranges. Any range may consist of multiple values of a packet characteristic or of a single value. One method of evaluating a packet classification list containing range sets is to evaluate each rule in turn, and each range set of a rule when that rule is evaluated. This method is computationally expensive to perform in software, as each range set may require evaluating a packet characteristic derived from the packet against all ranges of packet characteristics in that range set, and the number of ranges could be large.

Algorithmic approaches can reduce the number of steps required to determine if any single range set is matched by a packet characteristic value; for instance the ranges of a range set could be programmed into a data structure such as a trie, tree, or hash table, but in the straightforward implementation the determination is still expensive, as each table requires a separate memory or portion of memory to store it, a lookup in such a data structure may require multiple memory accesses, and there may be many such range set lookups required to evaluate a piece of data against a packet classification list.

Hardware-based methods may be used to help accelerate the determination of whether a piece of data matches a range set—a range set could be programmed into a known hardware lookup data structure such as a trie, tree, hash table, content addressable memory (CAM), or ternary content addressable memory (TCAM). However, when many range sets are present in a classification list, storing each range set into its own data structure requires a large and possibly infeasible amount of hardware resources, or hardware resources that are not present in a particular implementation.

In another approach, one can eliminate the need to evaluate complex range sets in a rule and reduce it to the need to evaluate exactly one range per field per rule through rule expansion. In the rule expansion approach, one transforms a rule containing one or more range sets into multiple rules with the same action as the original rule wherein each of the transformed rules contains one element of the cross-product of the constituent range sets of the expanded rule. However, doing so can yield an unmanageable number of transformed rules if the original range sets contain many entries. The number of transformed rules is equal in this approach to the cardinality of the set consisting of the cross product of all such expanded range sets, leading to a large amount of memory needed and/or longer lookup times due to the need to evaluate a much larger number of rules. For example, a rule containing three range sets, each consisting of 10 ranges, would expand into 1000 rules in this approach. A classification list consisting of 100 unexpanded rules of this form would require 100,000 expanded rules which would be prohibitively expensive or prohibitively slow, or both, to implement using commonly available hardware lookup techniques.

SUMMARY

A method and apparatus of a network element that processes network data using a transformed packet classification list in a network element is described. In an exemplary embodiment, the network element receives a packet classification list that includes a plurality of range sets for each of two or more types of packet characteristics, wherein each of the plurality of range sets is or can be represented as a set of one or more numerical ranges for a packet characteristic. The network element further transforms a first set of the plurality of range sets corresponding to a first one of the two or more types of packet characteristics into a first set of range labels. In addition, the network element transforms a second set of the plurality of range sets corresponding to a second one of the two or more types of packet characteristics into a second set of range labels. Furthermore, the network element creates a set of combination labels from the first and second set of range labels, wherein each of the combination labels in the set of combination labels is derived from one of the range labels in the first set of range labels and one of the range labels in the second set of range labels. In addition, the network element stores the set of combination labels in a first lookup table, where each of the entries in the first lookup table includes one of the first range labels, one of the second range labels, and a resulting combination label. The network element further processes network data by performing a first lookup in the first lookup table to derive a first combination packet label, performing a second lookup of at least the first combination packet label in a second lookup table, and applying a rule resulting from the second lookup to the network data.

In another embodiment, the network element processes network data using a transformed classification list by receiving the network data having a plurality of packet characteristics and retrieving the plurality of packet characteristics. In addition, the network element transforms a subset of the plurality of packet characteristics by performing a first lookup of the subset of the plurality of packet characteristics. The network element further performs a second lookup using the subset of the plurality of packet characteristics in a lookup table that stores the transformed packet classification as set of labels that are each derived from at least two types of the packet characteristics, where the second lookup returns a rule associated with the subset of packet characteristics. The network element additionally processes the network data using the rule.

Other methods and apparatuses are also described, including various optimizations that may be performed during the processing of the packet classification list.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
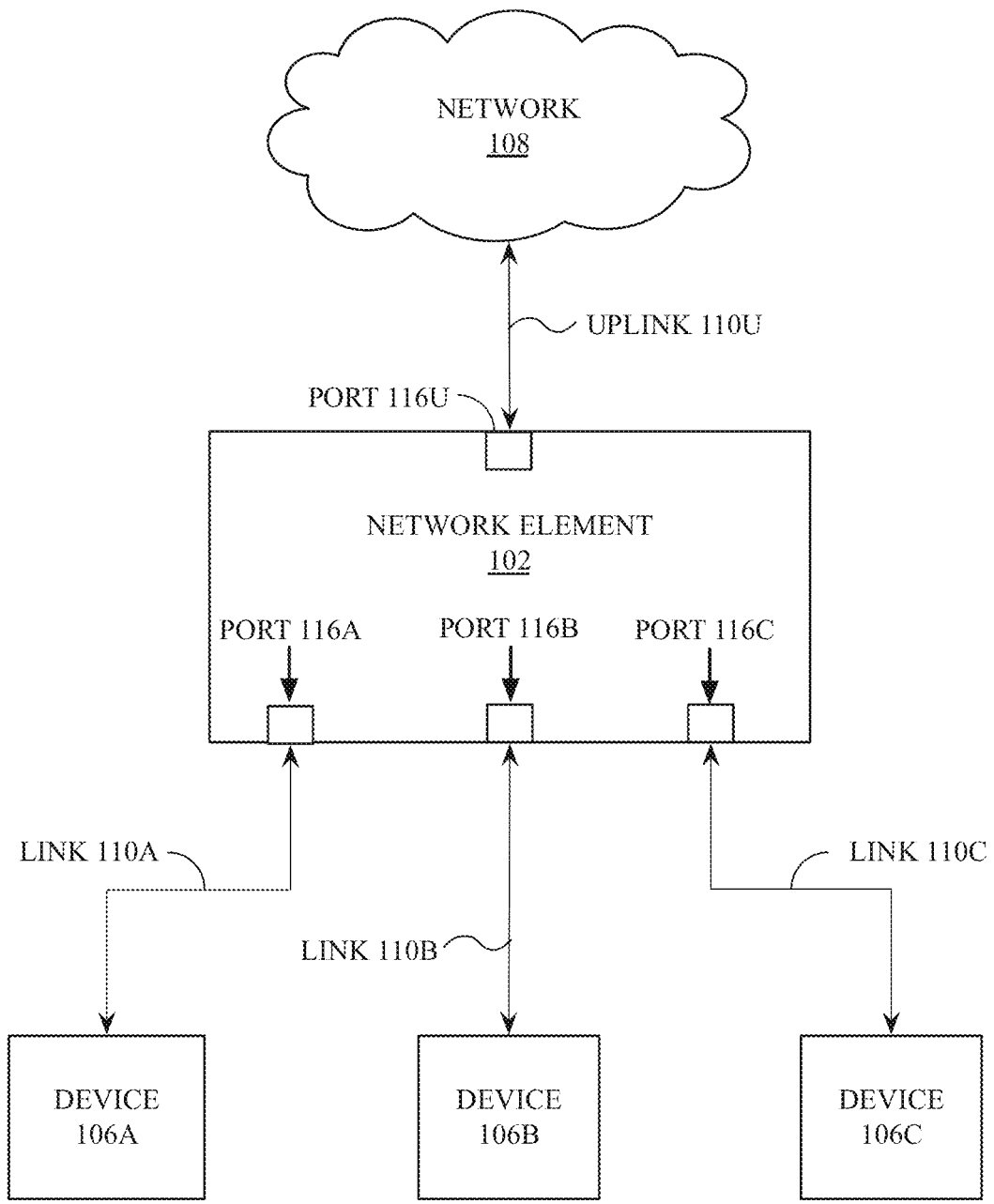
FIG. 1 is a block diagram of one embodiment of a system that includes a network element communicating network data between a network and a number of devices.

A method and apparatus of a network element that processes network data using a transformed classification list in a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes network data using a transformed packet classification list in a network element is described. In one embodiment, the network element receives the packet classification list through various sources (e.g., command line interface, script, management station, and/or other management sources used to configure the network element). In this embodiment, the packet classification list can include one or more packet classification entries that are more expressive than a simple address range and a rule. Instead, a packet classification entry can include one or more range sets wherein a range set includes a set of ranges of a packet characteristic value (or "field" value). A range set for an address may consist of a set of ranges of address values and/or individual address values, a range set for protocol ports may consist of a set of ranges of port values and/or individual port values, and generally range sets can be constructed for other types of packet characteristics of the network data as well. In one embodiment, the packet characteristic of the network data that is used in a range set can be a source address (IPv4, IPv6, Ethernet, or some other type of address), destination address (IPv4, IPv6, Ethernet, or some other type of address), source layer 4 port number, destination layer 4 port number, differentiated services code point (DSCP), Transmission Control Protocol/User Datagram Protocol (UDP) ports, and/or other types of packet characteristics.

In addition, a packet classification entry can include an 'except' element, where an except element removes a range of a packet characteristic from the packet classification entry such that a field value that falls within an excepted range or is equal to an excepted value is considered to not match the range set. In one embodiment, an example of a packet classification list is an Access Control List (ACL). An ACL can include one or more Access Control Entries (ACEs). For example and in one embodiment, the ACE 10 in Table 1 above includes an except element in the foo prefix-set 'ip prefix-set bar 10.0.0.0/8 20.1.1.0/24 except 10.10.10.0/24'. In this example, 256 addresses in the address range 10.10.10.0/24 are subtracted from the 16,777,216 addresses in the 10.0.0.0/8 range. In one embodiment, the except element would have the 10.0.0.0/8 range expanded into multiple entries such as 10.16.0.0/12, 10.0.0.0/13, 10.8.0.0/12, etc., so that the 10.0.0.0/8 range with the 10.10.10.0/24 except is expressed in individual ranges of permits and denies.

An obvious way of performing classification on a classification list consisting of rules with range sets is to expand each rule into multiple simple rules, each simple rule consisting of only one range for each packet characteristic. This can be done by computing a cross-product of all the constituent range set members for each range set specified in the rule. The expansion then produces a transformed classification list that includes more rules than the original list, but can be searched using known techniques (e.g., in hardware using a ternary CAM, using a linear search, or using other known algorithmic search techniques). However, this technique would in many cases yield an unmanageable number of rules, leading to a large amount of memory needed to store the transformed classification list and longer lookup times than are desirable or acceptable.

Instead of expanding the rules of the classification list into simple rules, in one embodiment, the network element transforms a classification list entry (rule) into a set of transformed rules where, in each transformed rule, the pair of range sets corresponding to two chosen packet characteristics in the original rule is replaced by a set of pairs of packet characteristic labels, each associated with one of the range sets in the original rule, each range set in turn being associated with a packet characteristic. In this embodiment, by transforming a rule containing range sets into a set of rules containing a pair of packet characteristic labels, a significantly smaller number of transformed rules are created than in the cross-product approach, which uses less memory to store and leads to a faster lookup as well.

In one embodiment, the network element receives the classification list and transforms the range sets expressed in one or more rules of the classification list into a set of labels for one or more packet characteristics used in the classification list. In this embodiment, the network element builds a data structure for each packet characteristic expressed in a range set, where each entry in the data structure includes a field value range and the set of range sets that this field value range belongs to. With this data structure, the network element associates a label to each set of range sets expressed in the data structure. In this embodiment, a transformation of a field is constructed in which a field value range is assigned the label that is associated with the set of range sets that the field value range belongs to. In one embodiment, this transformation is capable of handling a field value range used in an 'except' clause. In one embodiment, an except clause is handled by excluding the range set that contains the except clause from the set of range sets associated with the field value range used in the except clause. In one embodiment, a field is a part of a packet header that is used in the classification. Examples of the field are source IP address, destination IP address, source port, destination port, protocol, DSCP, and/or other types of parts of a packet. In one embodiment, a field is a packet characteristic.

With these labeled sets of range sets, in one embodiment, the network element further transforms this data into labeled pairs of packet characteristics. In this embodiment, the network element performs a cross product of the labeled sets of range sets, where the resulting cross product is a set of source-destination pairs of range sets (e.g., source-destination addresses or source-destination ports). In addition, the network element creates disjoint sets of the cross product, where each of the disjoint sets is disjoint from the other sets in this group. The network element further labels each disjoint set. In some embodiments, one or more source-destination pairs may be used as examples of one or more transformations of multiple fields, however, transformations of multiple fields can include more than two fields, may be performed on any combination of fields, and are not limited to sources and/or destinations.

In one embodiment, the network element stores these labeled disjoint sets of range set pairs in a lookup table as part of a key that be used to lookup the corresponding packet classification entry for the key. Furthermore, the network element stores the labeled range sets in a different or the same lookup table that can be used to lookup packet characteristics of the network data to be processed. These lookups are used by the network element to determine a packet classification entry in the packet classification list that applies to the network data.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments, links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines. In one embodiment, the network element 102 can also be a virtual machine.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
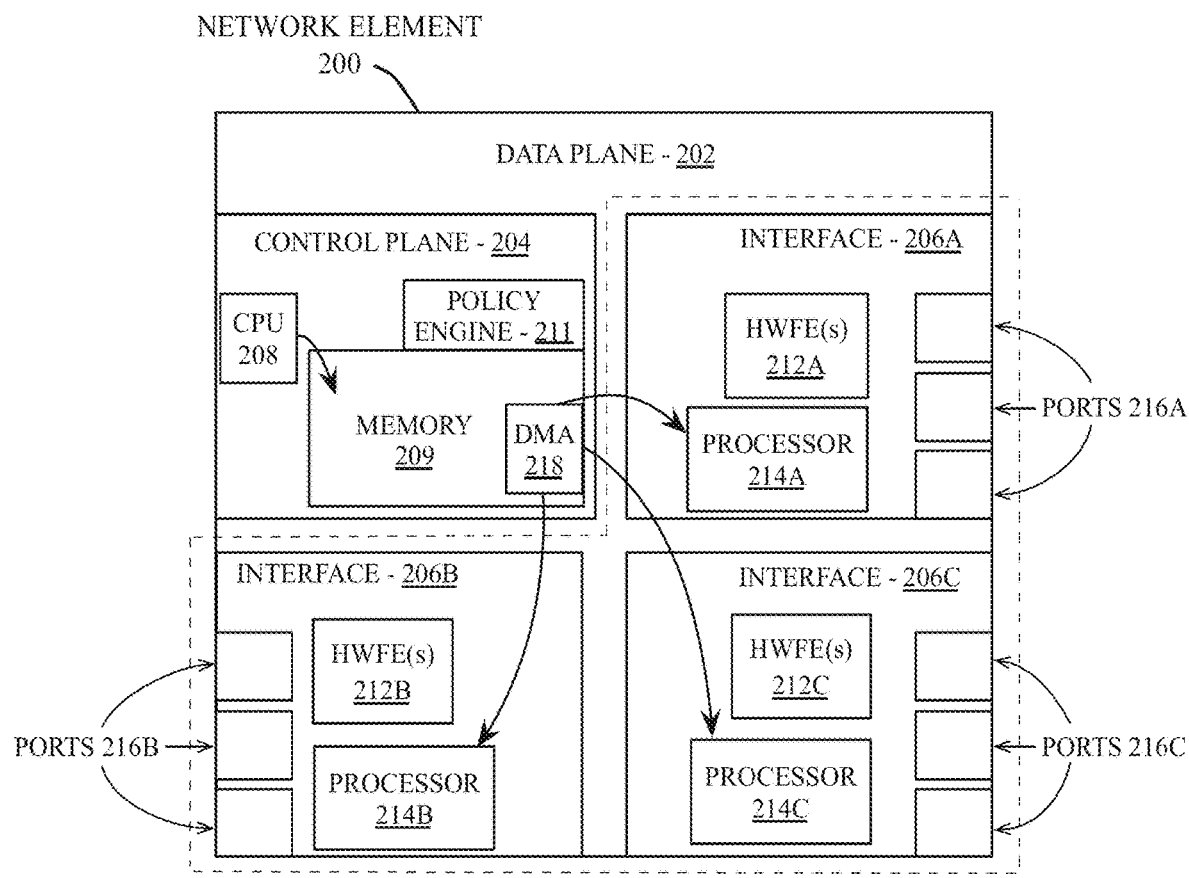
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can be configured to program corresponding hardware forwarding engines 212A-C. The processors 214A-C can also push data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209. In one embodiment, the DMA controller 218 allows the processors 214A to directly access the memory 209 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
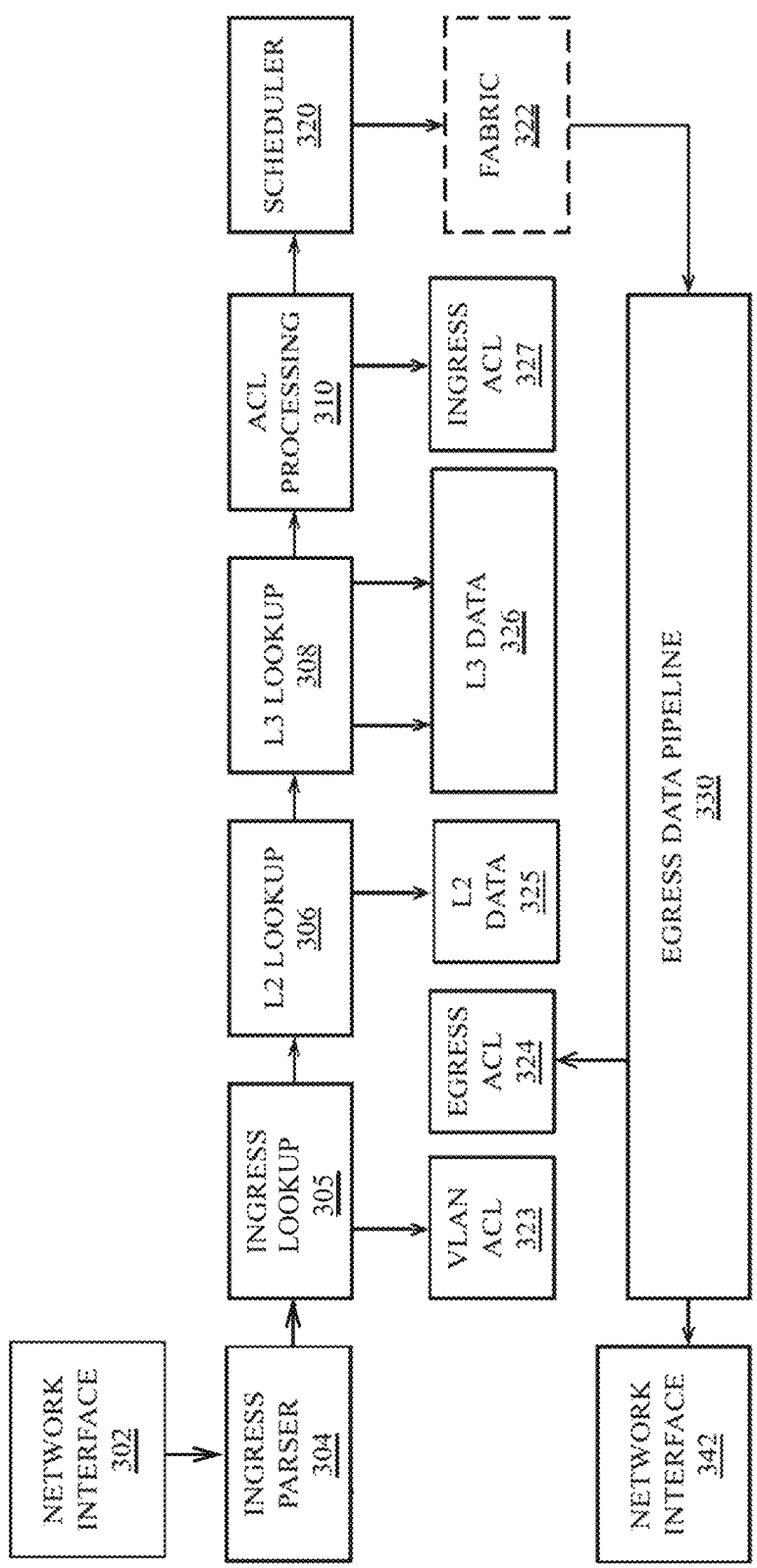
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 212), which includes logic from one or more of the HWFE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), a packet classification list processing block 310, and a scheduler 320. In one embodiment, the packet classification list processing block 310 includes packet classification list processing logic as described herein.

In one embodiment, a packet classification list can include one or more access control lists including range sets. The Access list can be a VLAN ACL 323, Ingress routed ACL, QOS ACL or policy based routing 327, or Egress ACL 324 that can be used to allow policy and/or filtering actions to be performed on network data at multiple stages within the forwarding pipeline 300. In one embodiment, the ACLs store an ordered list of rules that define access restrictions for entities of the network element, including a specified network interface (e.g., ingress network interface 302, egress network interface 342). In one embodiment, network data may be forwarded to the control plane of the network element, and an ACL can be configured to specify access restrictions to the control plane. The ACL rules specify the data to which fields of network data are compared. In another embodiment, a packet classification list can include a sequence of traffic policy rules containing range sets.

In one embodiment the forwarding pipeline 300 is configured to forward units of network data that match all conditions in a permit rule and to drop units of network data that match all conditions in a deny rule. For some ACLs, the forwarding pipeline is configured to deny (e.g., drop) units of network data that do not match at least one rule. Upon arrival at the ingress network interface 302, a unit of network data is processed based one or more ingress ACLs associated with the network interface 302 (e.g., VLAN ACL 323, Ingress ACL 327). In one embodiment, the network data can be additionally processed based on the egress ACL 324 before being forwarded via the egress network interface 342. In one embodiment, the ACLs can be used to perform actions other than permit and deny. For example, an access control entry may be specified which sets a traffic class for a unit of network data or sets a next hop for a unit of network data or selects a policer to be applied to the network data.

If a unit of network data is permitted through ACL processing, a forwarding decision can be made for the data. The L2 data 325 and L3 data 326 modules store various tables used to perform data-link layer (layer 2) and network layer (layer 3) forwarding of network data by the forwarding pipeline 300. In one embodiment, after processing and forwarding operations are performed by ingress elements of the forwarding pipeline, the scheduler 320 forwards ingress network data to a fabric module 322, which provides data-plane connectivity between multiple packet processors in the network element. In one embodiment, a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342. The egress data pipeline 330 can operate in parallel with other elements of the forwarding pipeline 300 described herein.

In one embodiment, forwarding operations for a unit of network data proceeds as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, ingress lookup 305 can perform a further comparison for the unit of network data against any configured Port ACLs by performing a lookup in the VLAN ACL 323. In one embodiment, if the unit of network matches a DENY statement, the unit will be dropped. If the unit of network data matches a PERMIT statement, or no port ACL is enabled, the unit of network data is passed to the next block of the pipeline. In another embodiment, the actions associated with a matching rule in an ACL may indicate some other type of action to be taken rather than permitting or dropping the unit of network data, such as selecting a policer, remarking the packet, choosing a counter or set of counters to update, selecting a different L3 next hop, selecting a layer Virtual Routing and Forwarding domain (VRF) to use for a subsequent L3 lookup, or selecting an outgoing interface or selecting or influencing in some way the forwarding action to be taken. Successive stages include L2 lookup 306 and an L3 lookup 308 stages. The L2 lookup 306 stage will reference L2 data 325, which may be a MAC address table, which is an exact-match table.

The L3 lookup 308 will reference L3 data 326, which includes an exact-match table that contains /32 IPv4 and /128 IPv6 host routes, and a longest-prefix match (LPM) table that contains IPv4 and IPv6 routes that are not host routes.

Packet Classification List Processing

Figure 4A:
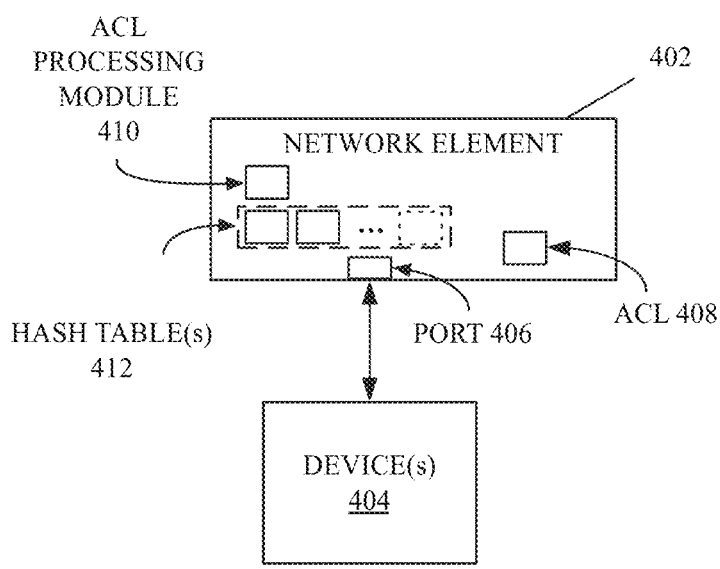
FIG. 4A is a block diagram of a packet classification list processing system, according to an embodiment.

FIG. 4A is a block diagram of a packet classification list processing system 400, according to an embodiment. The packet classification list processing system 400 includes a network element 402 that is coupled to a device 404 via a port 406. The network element 402 can use a packet classification list 408 to filter network data received via the port 406. In one embodiment, the packet classification list 408 can be any packet classification list described herein, including the VLAN ACL 323, egress ACL 324, or ingress ACL 327 of FIG. 3. The network element 402 additionally includes a packet classification list processing module 410, which, in one embodiment, includes hardware to perform packet classification list processing logic as described herein. The packet classification list processing module 410 is a specific example of a generalized network data classification module that can be applied generally for use in network data classification and access control. Accordingly, embodiments of the packet classification list processing module 410 have applications beyond access control and can be generally applied for many types of packet processing including forwarding, quality of service, mirroring, monitoring, routing table selection, counting, etc.

In one embodiment the packet classification list processing module 410 of the network element 402 converts the packet classification list 408, which may be an ordered packet classification list, into disjoint sets of labels representing range sets in the packet classification list 408. An ordered packet classification list can consist of an ordered series of rules, with each rule having a match criterion and an action. In one embodiment, the packet classification list includes an ACL. An ACL is applied to a piece of data by evaluating the data against the rules in order and taking the action of the rule that matched. The match criterion for each rule is a pair (V, M), where V is a numeric value up to N bits long and M is a mask of N 0 and 1 bits. A value X matches the rule if (X & M)==(V & M), where "&" is the bitwise "logical and" operator. In one embodiment, the values (X) matched against an ACL are Internet Protocol (IP) v4 or IPv6 addresses, or representations thereof. The address can be a source or destination address. In one embodiment, the (V, M) pairs match subsets of the IPv4 or IPv6 address space and the actions of an ACL are either a "permit" or a "deny". In one embodiment, an ACL be interpreted to include an "implicit deny" rule at the end that is equivalent to "deny (0, 0)".

In one embodiment the ACL processing module 410 supports multiple ACL types including quality of service ACLs, policy based routing ACLs, and security ACLs. The processing results of the different types of ACLs may be differently encoded. In general, the ACL processing logic may be used to perform classification of network traffic that includes policy based routing (PBR) and QoS classification, where PBR and QoS classification rules are processed, grouped into subsections having mutually exclusive rules, and applied to network data by processing the rules in each subsection. In one embodiment, the network element 402 includes one or more hash tables that are used to the transformed labeled range sets and/or the.

For packet classification rules, transformed packet classification entries could either be shared among different subsections (e.g., QOS, PBR, and/or Security) or be separate. The benefit of sharing is that fewer transformation lookups are required per packet also if subsection share a lot of similar address prefixes or port ranges the shared transformation would be smaller than the sum of the transformations if they were separate. One downside of sharing the transformation across subsections changing one subsection can require to update the transformations for all subsections requiring during table updates to suspend application of the packet classification.

Packet Classification List Transformation and Packet Processing

As described above, packet classification entries, including rules in ACLs, can be expressed in field-list style filters that are more expressive than simple access control elements by using sets of prefixes, ports, and/or other types of packet characteristics. In Table 1 above, the range sets foo and bar cover a wide variety of possible addresses. By expanding each rule into one rule corresponding to each member of the cross product of all the constituent members ranges of all range sets in each rule, for the access-list acl 1, there can be over 180 entries without expanding the except clauses into multiple entries. This would lead to severe requirements for memory and lookup times for a large classification list.

In one embodiment, instead of simply doing a cross-product expansion, the network element performs a transformation of the source and destination range sets into sets of labels for the packet characteristics encompassed by the packet classification list. For example and in one embodiment, a packet classification list can match on source address (IPv4, IPv6, or some other type of address), destination address (IPv4, IPv6, or some other type of address), source port number, destination port number, differentiated services code point (DSCP), Transmission Control Protocol (TCP) flags, time to live (TTL) field, header fragment fields, and/or other types of packet characteristics. One, some, or all of these types of packet characteristics can be expressed as a range set in one or more rules. In one embodiment, a range set can be a range of packet characteristics expressed as an address prefix range, which can be a prefix-set.

In one embodiment, a range set is expressible as a set of one or more numerical ranges for a packet characteristic, such as one or more ranges for an address, port, or another type of packet characteristic. For example and in one embodiment, the range sets foo and bar as illustrated in Table above are address ranges that can be matched to either a source and/or destination address. In this example, the foo range set includes three address ranges: 1.1.0.0/16, 2.0.0.0/8, and 200.1.1.1/32. Furthermore, a range set can include an except element that excludes a packet characteristic range from matching the range set. For example and in one embodiment, the range set bar includes an except element 10.10.10.0/24 that excludes this address range from the address range 10.0.0.0/8 in the range set bar.

In order to handle the possible millions and millions of combinations from these range sets, in one embodiment, a network element can transform these range sets into pairs of packet characteristic ranges, each corresponding to a combination label. There may be different sets of combination labels to represent combinations of different pairs of packet characteristics. For example and in one embodiment, after the transformation, there can be a set of combination labels for the combination of source IPv4 and destination IPv4 address, for the combination of source IPv6 and destination IPv6 address, for the combination of source L4 port and destination L4 port, and/or other combination of packet characteristic pairs with the same types of pairs (e.g. address pairs, port pairs, etc.). In another example, and embodiment, the packet characteristic pair can be a pair of packet characteristics of different types of range sets (e.g., source address-source port, destination address-destination port, source address-destination port, destination address-DSCP value, and/or another type of packet characteristic pair).

With the sets of labeled transformed pairs, the network element can perform packet classification list lookups on network data by transforming the packet characteristics of the network data into one of the known labels in these sets of labels for the packet characteristic pairs and performing a lookup using transformed packet characteristics. By having these sets of combination labels, the amount of entries needed for a lookup data structure is significantly reduced, which results in lower memory needed to store the lookup information and less lookup time to determine the appropriate rule to apply to the network data. In one embodiment, the key property that the combination label assignment ensures is that packets assigned to the same combination label are treated the same by the original packet classification list and by the lookup data structure that matches on the combination label. In effect, the combination label is a way of associating an equivalence class (with respect to the packet classification list) to a subset of the possible packets.

In one embodiment, the packet classification list is an ACL and the network element transforms the ACL into sets of labeled sets of range sets by transforming the range sets of the ACL into sets of labels for each of range sets of each of the packet characteristics. In one embodiment, this transformation is suitable for a prefix-set and is capable of handling an 'except' clause.

While in one embodiment this transformation can reduce the number of entries used for the transformed range sets compared to expanding the range sets using a simple cross product of the range set members, in alternate embodiments, the storage requirement for the number of entries in the packet classification lookup can be further reduced by creating pairs of the range sets. In this embodiment, by creating disjoint sets of labeled prefix-set pairs, the packet classification storage requirement and lookup time can be reduced further.

Figure 4B:
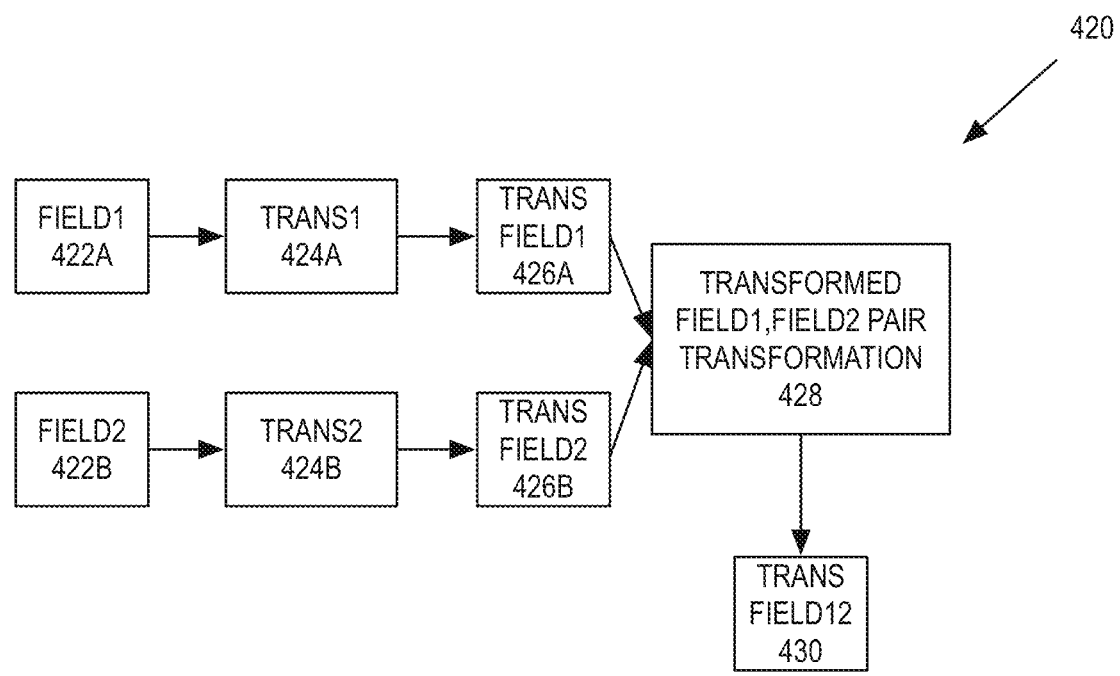
FIG. 4B is a block diagram of a flow to transform a packet classification list to sets of source-destination label pairs that is used to process received network data.

FIG. 4B is a block diagram of a flow 420 to transform a packet classification list to sets of source-destination label pairs that are used to process received network data. In FIG. 4B, the flow 420 illustrates two fields of packet characteristics 422A-B that are transformed into a transformed field pair. In one embodiment, field1 422A and field2 422B are transformed using the respective transformations 424A-B for these fields into single range labels ("range labels"). In this embodiment, which fields are transformed are based on the packet classification rules inputted by the network administrator. For example and in one embodiment, if a network administrator can input rules regarding source and destination addresses, the transformed fields can be source address and destination address. The transformed fields 426A-B are range labels that can be further transformed into a field1, field2 label pair 430. In one embodiment, the field1, field2 label pair 430 is used for the packet lookups as described below.

In one embodiment, in order to avoid an explosion of the combination of all possible combinations of the items in each field list, a network element can perform a transformation of one or more of the fields of the packet that summarize the respective field in terms of the relevant terms this field matches. With the summarized term, the network element can look up the summarized terms instead of the raw packet fields in a traditional classification engine that could be implemented in a TCAM or in an algorithmic data structure, such as described in the co-pending application Ser. No. 15/272,083, filed on Sep. 21, 2016, which is incorporated by reference. In one embodiment, a term is composed of a set of field lists to match. In order for a packet to match a term, the packet matches the patterns in the field list(s) of the term. One or more actions can be associated with a term, such as dropping the network data, permitting the network data, incrementing a counter, applying a policer, applying a load balancing vector, or generally affecting further processing of the packet for the network data.

In another embodiment, by looking at a single field and the lists and terms that a packet may be subject to, the space of that field may then be divided into a summarized field that reflects the possible terms that can be simultaneously matched. For a field, there is also a "no term hits" possibility. For IP address fields that are expressed as prefixes, this summarization can, in one embodiment, be determined by a longest prefix match.

In one embodiment, for a given field, there will be different possible results for the summarized field based on the intersection of the possible terms that can be matched. In one embodiment, a result for a field may be a Field Term Group ("FTG"). A given term will have a match for a field in one or more FTGs unless the field is a wildcard for that term. In one embodiment, a naive encoding of the FTGs will enumerate all the possible combinations of term intersections. Terms will still require to be replicated as each field will now be matched in many FTGs but hopefully the replication factors will be less than the original ones.

In a further embodiment, another encoding scheme can take advantage of possible nesting of FTGs. In this embodiment, consider if there are 3 terms A, B C and the term C is included in all FTGs that have B and term B is included in all FTGs that include A. An encoding scheme would be to express the FTGs as prefixes such that there is no duplication for terms A and B.

TABLE 2

FTG Encoding

| FTG | Terms matched | Encoding |
|---|---|---|
| FTG 0 | A, B, C | 000 |
| FTG 1 | A, B | 001 |
| FTG 2 | A | 010 |
| FTG 3 | none | 100 |

In Table 2, a field in the FTG 0 would match terms A, B, and C and would be given an encoding of 000, a field in the FTG 1 would match terms A and B and would be given an encoding of 001, and a field in the FTG 2 would match the term A and would be given an encoding of 001. A field that does not match any of the terms A-C has an encoding of 100. In one embodiment, by using this encoding scheme, a match for terms A, B, and C can be determined with a longest prefix match on the encoded FTG values as illustrated in Table 3 below.

TABLE 3

FTG Match

| Term | FTG match |
|---|---|
| A | 0/1 |
| B | 00/2 |
| C | 000/3 |
| Terms with wildcard on that field | /0 |

In one embodiment, a field with ranges in its terms (e.g., Layer-4 (L4) ports) may use a data structure to remap the field to an encoded value. In such an embodiment, remapping may be achieved with a remapping table that can either remap the full space or a more efficient multilevel table that exploits the fact that there is a limited number of unique ports and ranges being matched. The encoding schemes of FTGs can also benefit from the prefix encoding. A better encoding would be to express them as prefixes such that there would be no duplication for terms A and B.

In one embodiment, IP addresses matches can be expressed as prefixes for packet classification. In this embodiment, if two prefixes overlap completely, it is easy to handle when building a data structure that expresses which of the terms are overlapped. For L4 ports (TCP or UDP), and in one embodiment, it is common to express a match in a range of values where the boundaries might be arbitrary. In this embodiment, it is possible to have different matches that overlap but not completely.

TABLE 4

Match Terms for L4 Ports

| Match Term | Matches |
|---|---|
| R0 | 10-100 |
| R1 | 50 |
| R2 | 90-200 |

In Table 4, three overlapping match terms for L4 ports are illustrated: R0 has a range 10-100, R1 has a single value 50, and R2 has a range 90-200. In this example, R0 overlaps with R1 and R2. In one embodiment, one way to deal with these overlaps is to decompose the port ranges into non-overlapping regions, as illustrated in Table 5.

TABLE 5

L4 ports decomposition

| Port Value | matches |
|---|---|
| 0-9 | none |
| 10-49 | R0 |
| 50 | R0, R1 |
| 51-89 | R0 |
| 90-100 | R0, R2 |
| 101-200 | R2 |
| 201-65535 | none |

With the decomposition, if there are terms which match on the TCP source port using ranges R0, R1, R2, as named above, and in such combination:

TABLE 6

Term to Range Mapping

| Term | Range |
|---|---|
| A | R0 |
| B | R1, R2 |
| C | R2 | then Table 7 illustrates a set of FTGs to use for the TCP source ports.

TABLE 7

Example of FTGs for L4 Ports

| Port Value | Matches Ranges | Matches Term |
|---|---|---|
| 0-9 | None | None |
| 10-49 | R0 | A |
| 50 | R0, R1 | A, B |
| 51-89 | R0 | A |
| 90-100 | R0, R2 | A, B, C |
| 101-200 | R2 | B, C |
| 201-65535 | None | None |

In one embodiment, these FTGs can be folded such that they match L4 source groups together. A set of FTGs can be used for both UDP and TCP packets, or for both IPv4 and IPv6 packets. However, there still is a need for separate encodings for source and destination ports.

It is common that pairs of fields in packet classification terms are both present with lists of possible matches. For example a lot of terms could match both on lists of source IP and destination IP. In that case since there could be many different encodings for the FTGs that need to be matched both for these fields. A naive implementation would do a cross product of all encodings for the pairs of FTGs. An improvement is to create another field to match on that is the combination of a pair of fields that summarizes if both fields match the term. This can be performed by first summarizing the fields independently and encoding the result in independent FTGs but then looking up these FTGs in a data structure that would return the combination of the match of terms for both of these fields. For example and in one embodiment, a data structure for the summarized FTG is an exact match table, which can be implemented as a hash table.

In one embodiment, by using the summarized FTGs, summarized pairs of FTGs can be generated. In one embodiment, and as described above, if there are three terms A, B, and C and a pair of fields where the possible field groups are such:

TABLE 8

FTGs for Terms A, B, and C

| FieldX | Term Matched | FieldY | Term Matched |
|---|---|---|---|
| FTG X0 | A, B, C | FTG Y0 | A, B |
| FTG X1 | A, B | FTG Y1 | B |
| FTG X2 | A | FTG Y2 | A, C |
| FTG X3 | None | FTG Y3 | None |

The network element can find the FieldXY FTGs by iterating over the FTGs for field X, iterating over the FTGs for field Y and finding the common terms matched by each X, Y pair. Each unique set of common terms found may form a FieldXY FTG. For example and in one embodiment, for FTGs {X0, Y0}, the common terms matched are A and B (e.g., expressed {A, B}). Similarly, for FTGs {X0, Y1}, {X0, Y2}, {X1, Y2}, and {X2, Y1}, the common terms matched are {B}, {A, C}, {A}, and {none}, respectively. In this example, the FTGs {X0, Y0}, {X0, Y1}, {X0, Y2}, {X1, Y2}, and {X2, Y1} can be written as FTGs XY0, XY1, XY2, XY3, and XY4, respectively. In this example, the encoding for the FTGs XY0, XY1, XY2, XY3, and XY4 can be 010, 101, 001, 000, and 100.

TABLE 9

FTGs for Two Field Summarization

| FTGXY | Term Match | Encoding |
|---|---|---|
| FTG XY0 | A, B | 010 |
| FTG XY1 | B | 101 |
| FTG XY2 | A, C | 001 |
| FTG XY3 | A | 000 |
| FTG XY4 | None | 100 |

In one embodiment, similarly as before, an encoding that reflects nesting and overlap can be devised to optimize the matching for certain terms. As can be seen this is not perfect as, with the encoding of Table 9, we improved term A from having to match three different FTGs to a single prefix but term B still requires to match two separate FTGs.

TABLE 10

Term Match for Pairwise FTGs

| Term | FTG XY match |
|---|---|
| A | 0/1 |
| B | 101/3 and 010/3 |
| C | 001/3 |
| Terms with wildcards on both those fields | /0 |

The network element can populate a data structure, such as an exact match table, with all the combinations of FTGs that map the combinations of FTGs from each field to the proper FTG for the combination of fields. A miss on this exact match table would result in an encoding for no match, such as in the example of Table 9, the none encoding of 100. As illustrated in the Table below, the parentheses show the terms matched for each field to help understand that the combination of field X and field Y in the key produces a result that expresses the intersection of the terms matched.

TABLE 11

Key-Value Mappings

| Key | Value |
|---|---|
| FTG X0(A, B, C), FTG Y0(A, B) | FTG XY0(A, B) |
| FTG X0(A, B, C), FTG Y1(B) | FTG XY1(B) |
| FTG X0(A, B, C), FTG Y2(A, C) | FTG XY2(A, C) |
| FTG X1(A, B), FTG Y0(A, B) | FTG XY0(A, B) |
| FTG X1(A, B), FTG Y1(B) | FTG XY1(B) |
| FTG X1(A, B), FTG Y2(A, C) | FTG XY3(A) |
| FTG X2(A), FTG Y0(A, B) | FTG XY3(A) |
| FTG X2(A), FTG Y2(A, C) | FTG XY3(A) |

In another embodiment, not all combinations of FTGs from field X and field Y are present in the exact match table. For example and in one embodiment, FTG X2(A), FTG Y1(B) are not present since the intersection is none and a miss in the table produces that result. In addition, there can be keys that produce the same result as the intersection of the terms matched is the same.

While in one embodiment, the network element has generated combinations of a pair of fields, in alternate embodiments, the network element can extend this scheme to more fields where the key to the data structure (e.g., an exact match table) includes more than two keys. Choosing this combination of fields would be based on a prevalence of terms that match on the all these fields.

Figure 4C:
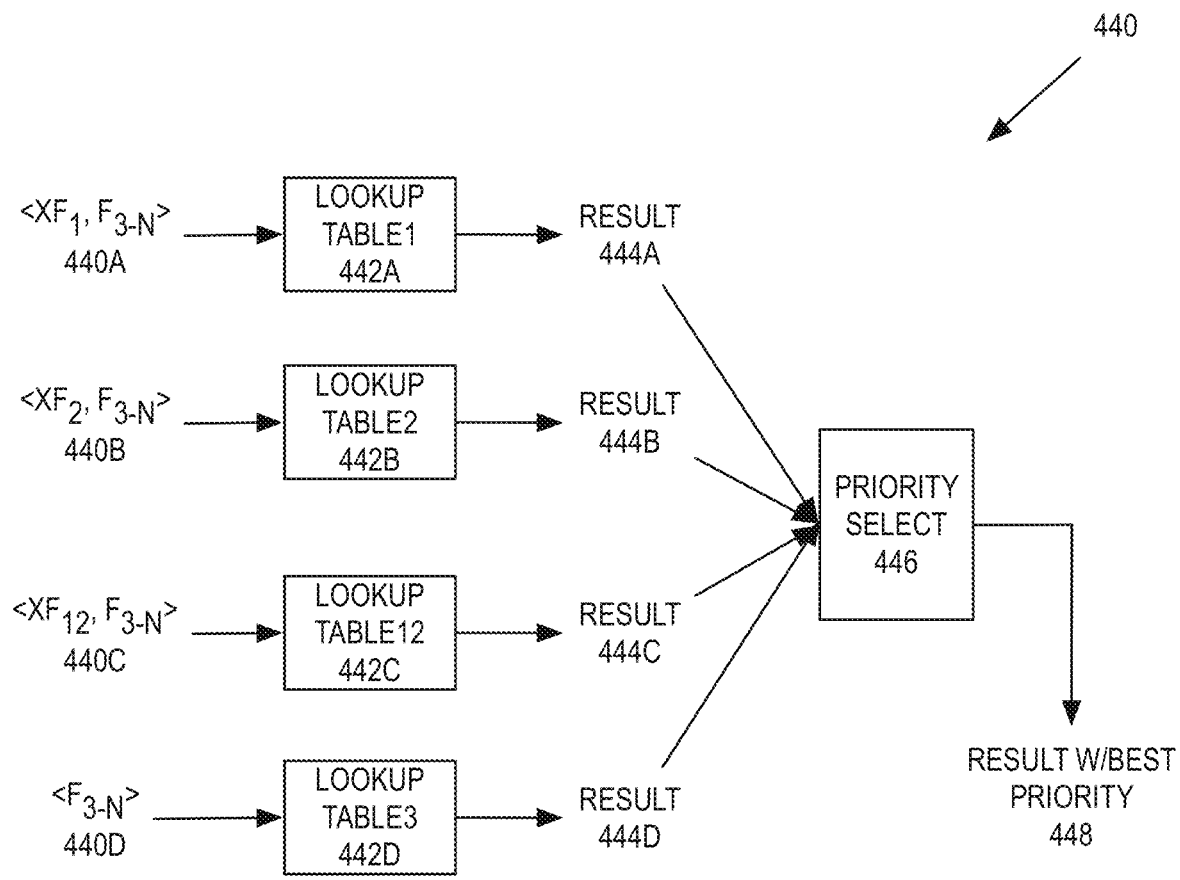
FIG. 4C is a block diagram of a flow to process network data using the transformed sets packet classification list.

In one embodiment, with the transformed label pairs, the network element can use these transformed label pairs for efficient packet lookups. FIG. 4C is a block diagram of a flow 440 to process network data using the transformed sets packet classification list. In one embodiment, the flow 440 uses multiple lookup tables 442A-D to perform different types of lookups on different types of transformed packet characteristics. In one embodiment, flow 440 uses transformed lookups for field1 ($XF_1$, 440A), field2 ($XF_2$, 440B), transformed field1, field2 pairs ($XF_1$, $XF_2$, 440C), and other fields using respective lookup tables 442A-D. In one embodiment, the lookup tables 442A-D can be separate, combined, and/or partially separate and combined. Furthermore, the lookup tables that use the transformed fields are lookup tables populated with the transformed field or field pairs labels. For example and in one embodiment, lookup table1 442A would include the range labels for the transformation of field1 (e.g. source address, source port, destination address, destination port, or some other packet characteristic). Lookup table2 442B would include the range labels for the transformation of field2 (e.g. another one of source address, source port, destination address, destination port, or some other packet characteristic). Lookup table12 442C would include the combination labels for the transformation of the field1, field2 pairs (e.g. source-destination address pair, source-destination port pair, or some other packet characteristic pair).

In one embodiment, a lookup using one or more of these lookup tables 442A-D can lead to one or more results 444A-D. In this embodiment, the flow 440 chooses one of the results using a priority selection mechanism 446. In one embodiment, the result with the best priority is selected and the rule associated with result is applied to the packet 448.

Figure 4D:
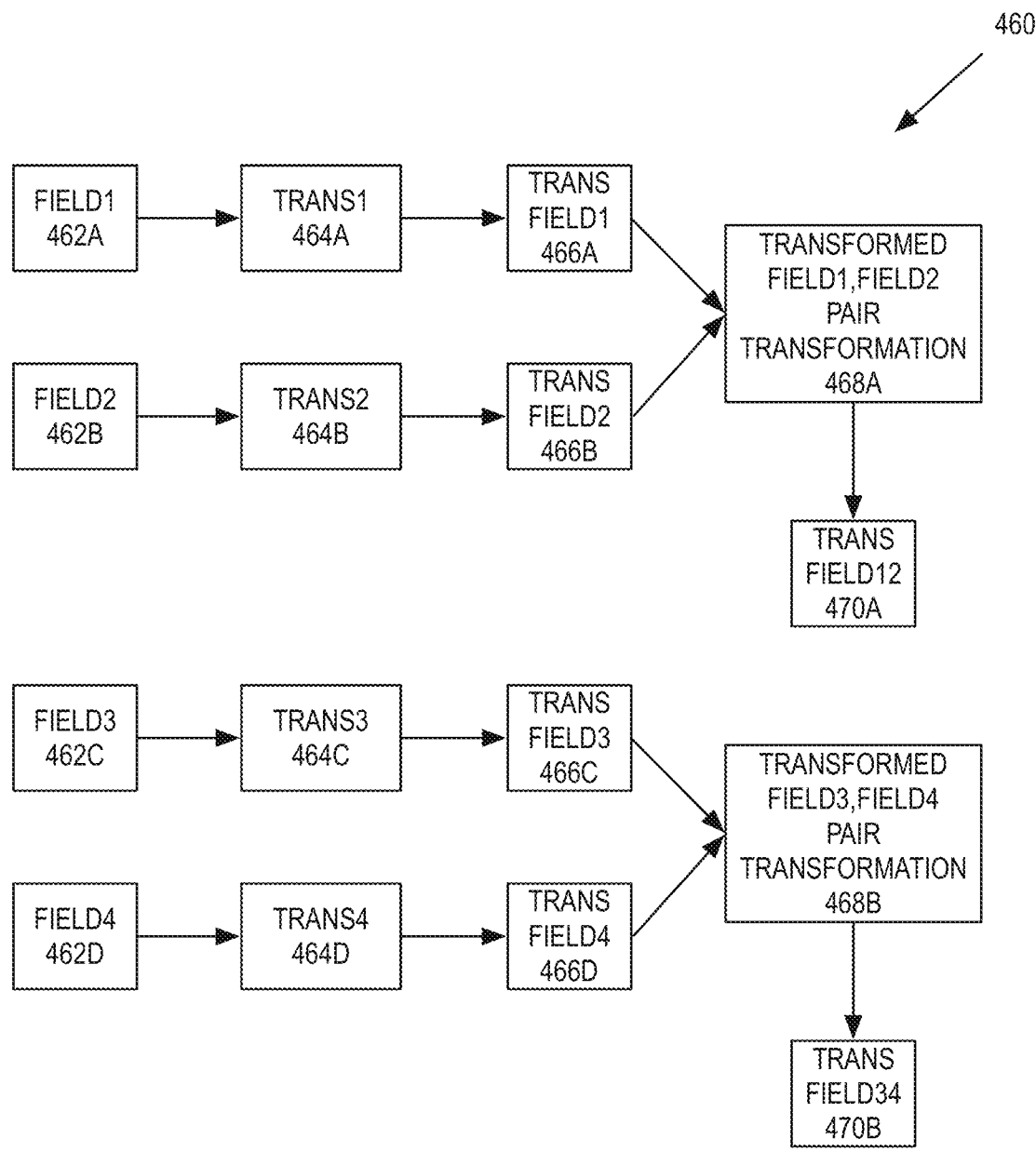
FIG. 4D is a block diagram of a flow to transform a packet classification list to sets of source-destination label pairs that is used to process received network data using different types of label pairs.

While in one embodiment, a single packet characteristic pair is illustrated for lookup table structure and label pairs, in alternate embodiments, there can be multiple transformed pairs that are used for packet matching. FIG. 4D is a block diagram of a flow 460 to transform a packet classification list to sets of source-destination label pairs that is used to process received network data using different types of label pairs. In FIG. 4D, the flow 460 illustrates four fields of packet characteristics 462A-D that are transformed into two transformed field pairs. In one embodiment, field1 462A, field2 462B, field3 462C, and field4 462D are transformed using the respective transformations 464A-D for these fields into range labels. In this embodiment, which fields are transformed are based on the packet classification rules inputted by the network administrator. For example and in one embodiment, if a network administrator can input rules regarding source and destination addresses and source and destination ports, the fields to be transformed can be source address, destination address, source port, and destination port. The transformed fields 466A-D are then range labels that can be further transformed into field1, field2 combination label 470A and field3, field4 combination label 470B. In one embodiment, which fields are candidates for field combination labels is based on at least the packet classification rules inputted by the network administrator. In one embodiment, the field1, field2 combination label 470A and field3, field4 combination label 470B is used for the packet lookups as described below.

Figure 4E:
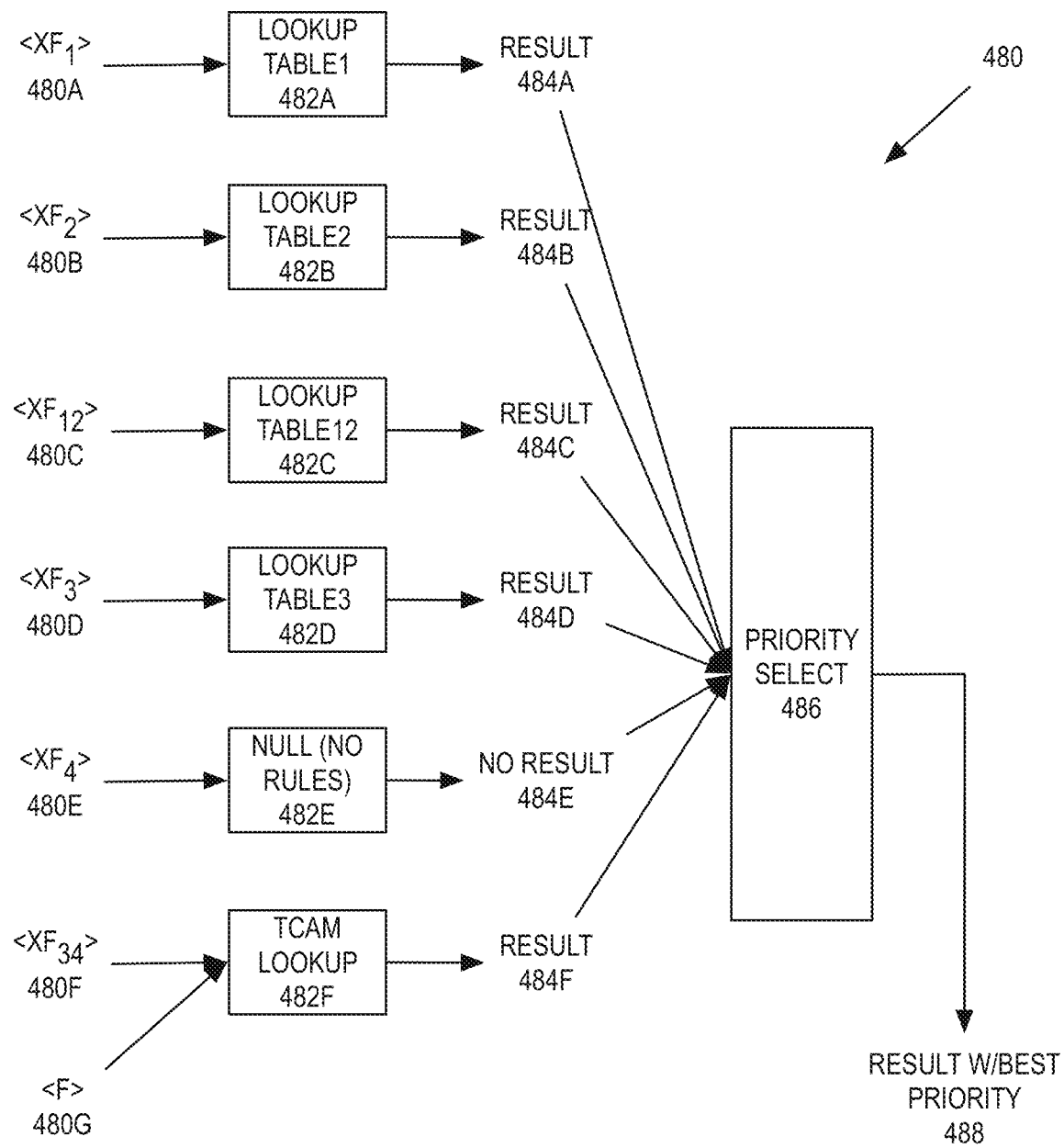
FIG. 4E is a block diagram of a flow to process network data using the transformed sets packet classification list using different types of label pairs.

FIG. 4E is a block diagram of a flow to process network data using the transformed sets packet classification list using different types of label pairs. In FIG. 4E, in one embodiment, the flow 480 uses multiple lookup tables and/or other types of lookup mechanisms (e.g., TCAM) 482A-F to perform different types of lookups on different types of transformed packet characteristics. In one embodiment, flow 480 uses transformed lookups for field1 ($XF_1$, 480A), field2 ($XF_2$, 480B), field3 ($XF_3$, 480D), field4 ($XF_4$, 440E), transformed field1, field2 pair ($XF_1$, $XF_2$, 480C), transformed field3, field4 pairs ($XF_3$, $XF_4$, 480F), and other fields using respective lookup mechanisms 482A-F. In one embodiment, the lookup mechanism 482A-F can be separate, combined, and/or partially separate and combined. In addition, the lookup mechanism can be different types of lookup mechanisms. For example and in one embodiment, the flow can use lookup tables for transformed fields1-3 (480A-B and 480D) and transformed field pair 12 (480C). In addition, there may be no rules for matching to a transformed field4 (480E). In this embodiment, the transformed field pair 34 (480F) and other rules may be in a TCAM lookup 482F.

Furthermore, the lookup mechanisms that use the transformed fields are lookup tables populated with the transformed field or field pairs labels. For example and in one embodiment, lookup mechanisms for transformed fields 1-4 (482A-B, 482D, and 482E) would include the field labels for the different transformation of fields 1-4 (482A-B, 482D, and 482E) (e.g. different ones of source address, source port, destination address, destination port, or some other packet characteristic). For example and in one embodiment, transformed field1 480A could be source address, transformed field2 480B could be destination address, transformed field3 480D could be source port, and transformed field4 480E could be destination port. In another embodiment, lookup table12 482C would include the combination labels for the transformation of the field1, field2 pairs (e.g. source-destination address pair, source-destination port pair, or some other packet characteristic pair), whereas TCAM lookup 482F would include combination labels for the transformation of field3, field4 pairs (e.g. another one of source-destination address pair, source-destination port pair, or some other packet characteristic pair). In one embodiment an untransformed field may be included in the lookup along with transformed fields, as shown by field 480G in TCAM lookup 482F.

In one embodiment, a lookup using one or more of these lookup mechanisms 482A-F can lead to one or more results 484A-F. In this embodiment, the flow 480 chooses one of the results using a priority selection mechanism 486. In one embodiment, the result with the best priority is selected and the rule associated with result is applied to the packet 488.

Figure 4F:
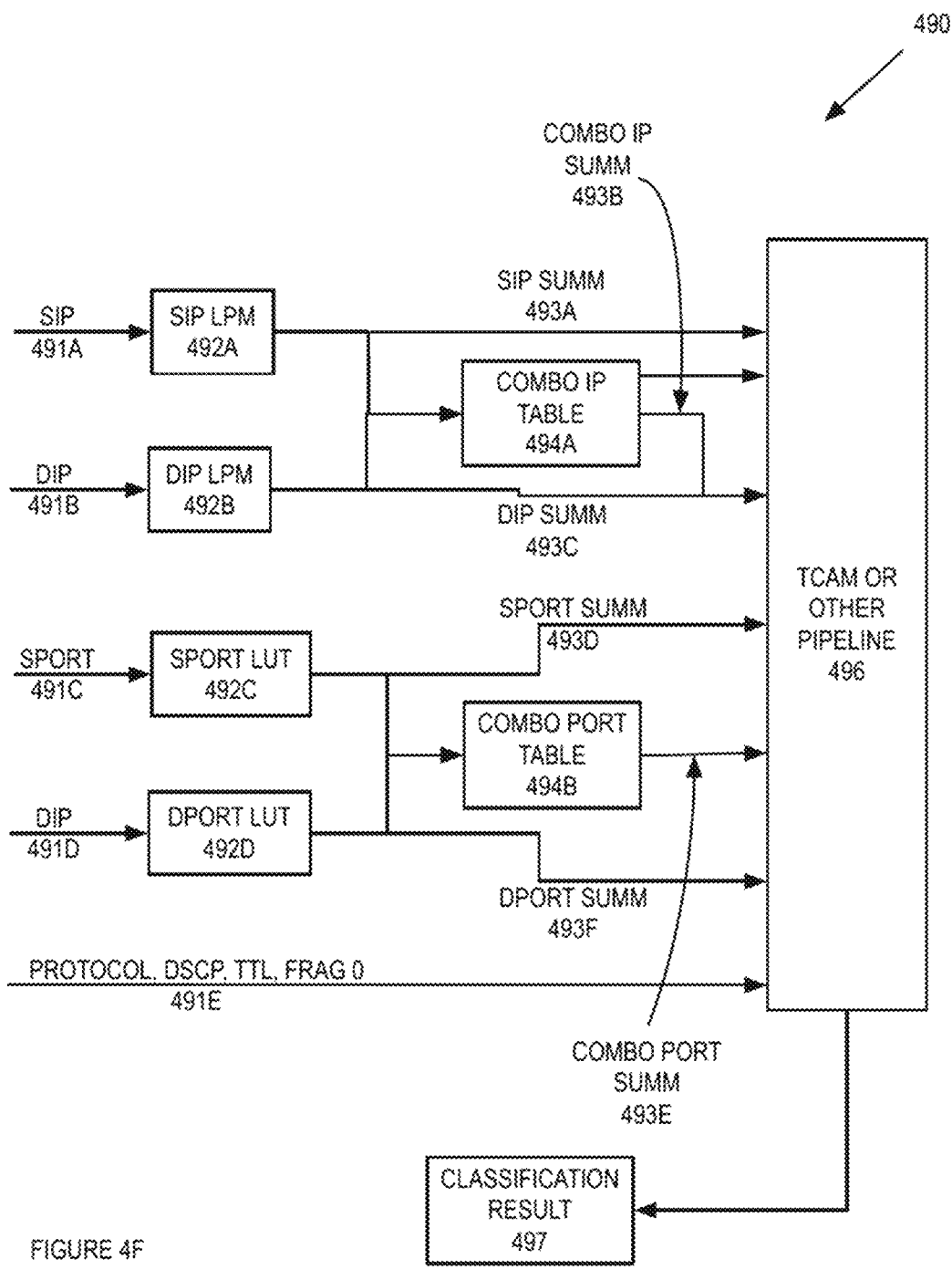
FIG. 4F is a block diagram of a flow to process network data using the transformed sets packet classification list using source, destination address and source, destination ports pairs.

FIG. 4F is a block diagram of a flow 490 to process network data using the transformed sets packet classification list using source, destination address and source, destination ports pairs. In one embodiment, FIG. 4F is a specific embodiment of a particular use of summarized fields and filed pairs. In this embodiment, a TCAM or other pipeline mechanism 496 can receive various inputs to determine a classification result for a packet. For example and in one embodiment, the TCAM or other pipeline mechanism 496 can receive a summarized source IP address 493A, summarized destination IP address 493C, combination summarized IP source, destination address pair 493B, summarized source port 493D, summarized destination port 493F, combination summarized IP source, destination address pair 493E, and/or non-summarized field values from the other packet characteristics 491E (e.g., protocol, DSCP bit, fragment 0 information) 491E. In this example, the TCAM or other pipeline mechanism 496 receives some or all of this information and uses this received information to determine a classification result 497. In one embodiment, the flow 490 receives the source IP address 491A, destination IP address 491B, source port 491C, destination port 491D, and other packet characteristics 491E (e.g., protocol, DSCP bits, fragment information). In one embodiment, the flow 490 performs a longest prefix match 492A on the source IP address 491A that results in a summarized source IP address 493A. The flow 490 can perform a longest prefix match 492B on the destination IP address 491B that results in a summarized destination IP address 493C. In addition, the flow 490 can use the summarized source IP address 493A and summarized destination IP address 493C to generate a combination summarized source, destination IP address field value 493B.

In addition, and in one embodiment, the flow 490 can create summarized field values for port information. In this embodiment, the flow 490 can perform a lookup of the source port 491C using a source port lookup table 492C that results in a source port summary 493D and/or the flow can perform a lookup of the destination port 491D using a destination port lookup table 492D that results in a destination port summary 493F. Furthermore, in this embodiment, the flow 490 can use the summarized source port 493C and summarized destination port 493D to generate a combination summarized source, destination port 493E.

Figure 5:
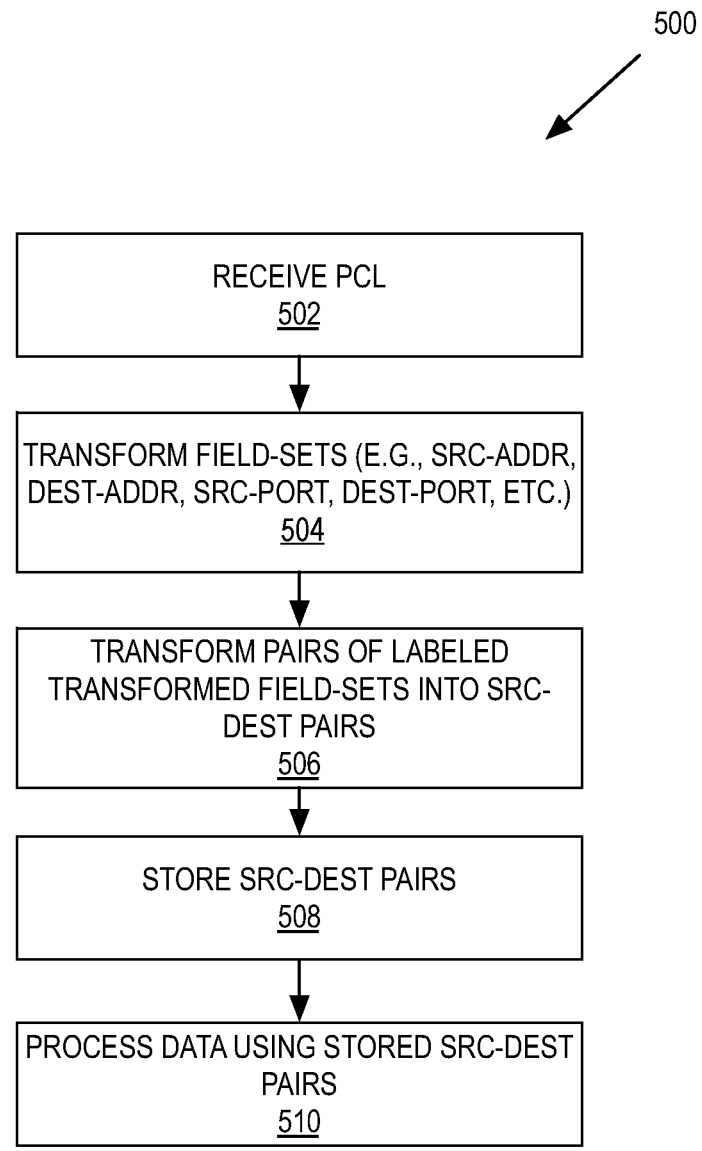
FIG. 5 is a flow diagram of one embodiment of a process to transform a packet classification list to sets of source-destination label pairs that is used to process received network data.

FIG. 5 is a flow diagram of one embodiment of a process 500 to transform a packet classification list to sets of source-destination combination labels that is used to process received network data. In one embodiment, a packet classification list processing module performs process 500, such as the packet classification list processing module 410 as described in FIG. 4 above. In FIG. 5, process 500 begins by receiving the packet classification list. In one embodiment, the packet classification list is a list of packet classification entries as described above, where one or more of the packet classification entries can include a range set for one of the packet characteristics described in the packet classification list. At block 504, process 500 transforms the range sets in the packet classification list into sets of labels for the each of range sets of each of the packet characteristics. In one embodiment, this transformation is suitable for a range set and is capable of handling an 'except' clause. In one embodiment, the transformation is further discussed in FIG. 6A below.

At block 506, process 500 transforms the pairs of the labeled transformed range sets into combination labels of packet characteristics. In one embodiment, process 500 can transform the transformed range sets into source-destination pairs of combination labels that represent disjointed combinations of different pairs of packet characteristics. For example and in one embodiment, after the transformation, there can be sets of labels for source-destination combinations of IPv4 or IP6 addresses, source-destination combinations of ports, source address-source port, destination address-destination port, source address-destination port, destination address-source port, and/or other types of packet characteristics pairs. Transforming the range sets into source-destination pairs of labels that represent disjointed combinations of different pairs of packet characteristics is further described in FIG. 7 below.

Process 500 stores the source-destination pairs in a lookup table at block 508. In one embodiment, process 500 stores these source-destination pairs into a hash table. In one embodiment, the hash table stores keys and labels, where a key is generated for the label and stored in a hash table entry. For example and in one embodiment, the key can be a 34-bit key, where 1 bit indicates whether the key is for a prefix or a port, another bit is used to indicate the prefix is IPv4 or IPv6, 16 bits are used for the transformed source prefix or port, and another 16 bits are used for the transformed destination prefix or port. The resulting label can be a 16-bit label (or another sized label). At block 510, process 500 processes network data using the stored labeled source-destination pairs. Processing the network data using the stored labeled source-destination pairs is further discussed in the FIG. 8 below.

Figure 6A:
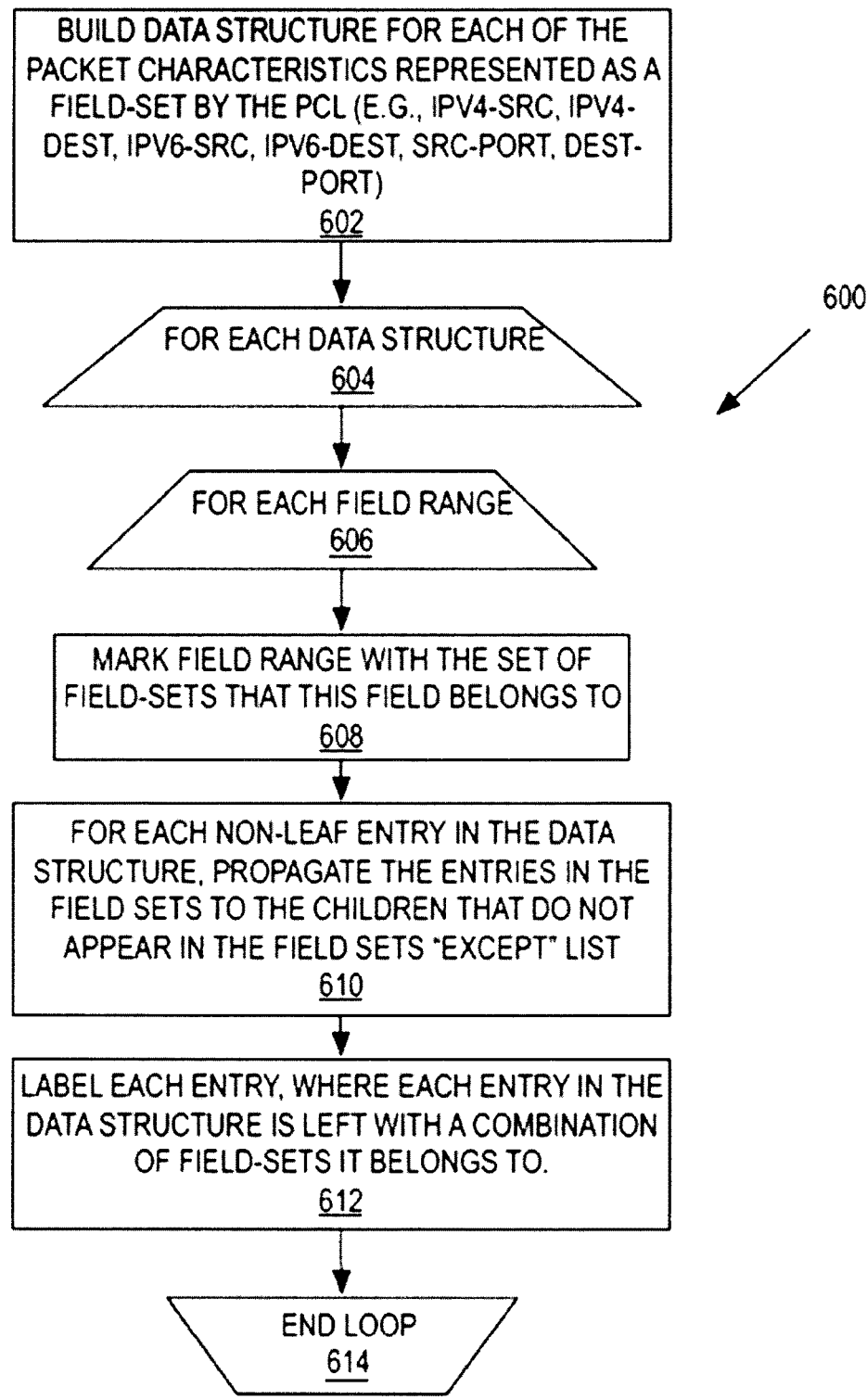
FIG. 6A is a flow diagram of one embodiment of a process to transform range sets in the packet classification list to a set of labels for one or more packet characteristics covered in the packet classification list.

FIG. 6A is a flow diagram of one embodiment of a process to transform range sets in the packet classification list to a set of field labels for one or more packet characteristics covered in the packet classification list. In one embodiment, process 600 is performed by process 500 at block 504 above. In FIG. 6A, process 600 begins by building a data structure for each of the packet characteristics represented by a range set at block 602. In one embodiment, a packet characteristic that can be represented by the range set can include source IPv4 addresses, source IPv6 addresses, destination IPv4 addresses, destination IPv6 addresses, source ports, destination ports, and/or other types of packet characteristics that can be represented by range sets. While in one embodiment, process 600 builds a trie for each of the range sets, in some embodiments, process 600 can use a different type of data structure (e.g., a mapping table where an N-bit field is mapped to a smaller M-bit field).

In an embodiment, an exemplary data structure for a packet characteristic may be a tree wherein each node of the tree is associated with a range of that packet characteristic that appears within the packet classification list, and also associated with the set of rules in which that range appears. A range in the packet classification list for the selected packet characteristic is represented by some node in the tree. The tree may be constructed so that a node is a child of another node if the range associated with the child node is completely contained within the range associated with the parent node. If there is a range that "overlaps" another range (e.g., of the same packet characteristic) in the original packet classification list, it must first be split into two ranges. For example, if one range is "100-131" and another range is "128-192," these ranges may be broken into three ranges, such as "100-127," "128-131," and "132-192." In this example, the rules specifying range "100-131" may be first modified to include "100-127" and "128-131" instead. Likewise, rules specifying range "128-192" may be modified to include "128-131" and "132-192.". In such an embodiment, if a range is completely contained within another range (e.g. "128-131" and "100-200"), then no splitting of the range may be required.

Process 600 further executes an outer processing loop (at blocks 604-614) to process each of the data structures and an inner processing loop (at blocks 606-614) to process each range (represented by a node) of the data structure. At block 608, process 600 marks the node with the set of range sets that the range associated with the node belongs to.

At block 610, for each non-leaf entry in the data structure, process 600 propagates each range set associated with a node to its children (and its children's children, and all further descendants) if the child's range is not contained in the parent range set's 'except' list. Process 600 labels each node in the data structure with a label that is unique to the set of range sets that the node's associated range belongs to, at block 612. The inner and outer processing loops end at block 614.

For example and in one embodiment, a packet classification list contains rules that include range sets for the source IPv4 address packet characteristic. In this example there are two range sets, S1 and S2, as follows:

Let range set S1 be {10.0.0.0/8, 11.1.1.0/24, 12.1.1.1/32} and

Let range set S2 be {10.0.0.0/8, except 10.10.0.0/16}.

Figure 6B:
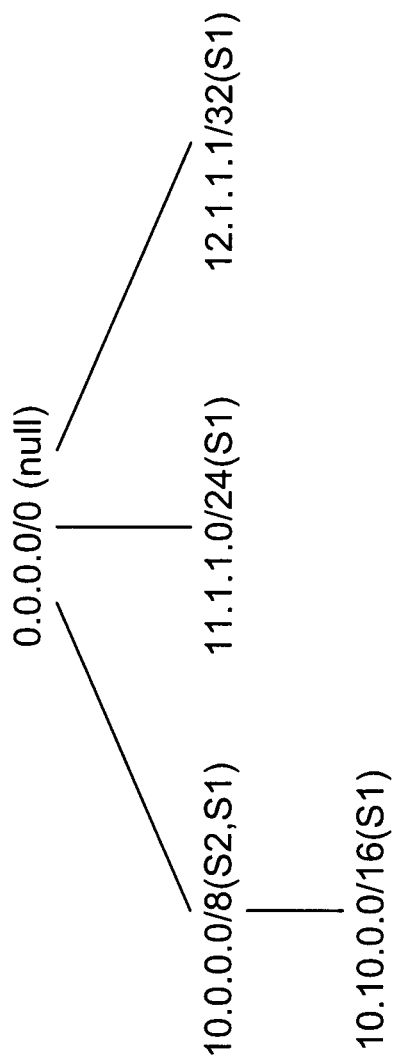
FIG. 6B shows a diagram that represents a resulting tree in accordance with some embodiments.

A tree can be built, where each node is associated with a prefix of one of the prefix sets and also with the set of range sets that the node's prefix belongs to. The resulting tree is constructed as shown in FIG. 6B. In the example shown in FIG. 6B, the prefix 0.0.0.0/0 is the root node. The child nodes of the root entry are 10.0.0.0/8, 11.1.1.0/24, and 12.1.1.1/32 because these prefixes are subsets of (e.g., completely contained within) the root node's prefix 0.0.0.0/0, but none is contained within any other. In addition, each node is associated with the set of range sets that the node's prefix belongs to. In the resulting tree, different sets of the range sets are generated. For example and in one embodiment, in the tree as shown in FIG. 6B, there are three sets of range sets: (S1), (S2), and (S1, S2). In one embodiment, a range label is assigned to each of the different sets of range sets. For example and in one embodiment, the range labels L0, L1 and L2 can be assigned as follows:

(S2, S1)→L0
(S1)→L1
(S2)→L2

In one embodiment, this transformation is suitable for a range set and is capable of handling the 'except' clause. In one embodiment, the transformation of a field value to the label associated with its corresponding set of range sets can be implemented using a trie or in a TCAM, and the lookup is done in the VLAN ACL 325, Ingress ACL 327, Egress ACL 325, and/or ACL processing 310 stages as described in FIG. 3 above.

In one embodiment, each of the range sets may occur in multiple sets of range sets which resolve to different labels. In the example above, S1 can now be resolved to both to the labels L0 and L1. Therefore, for any packet classification entry having S1, the range set S1 is duplicated twice, one for L0 and one for L1, in order to cover the fields associated with S1.

Figure 7:
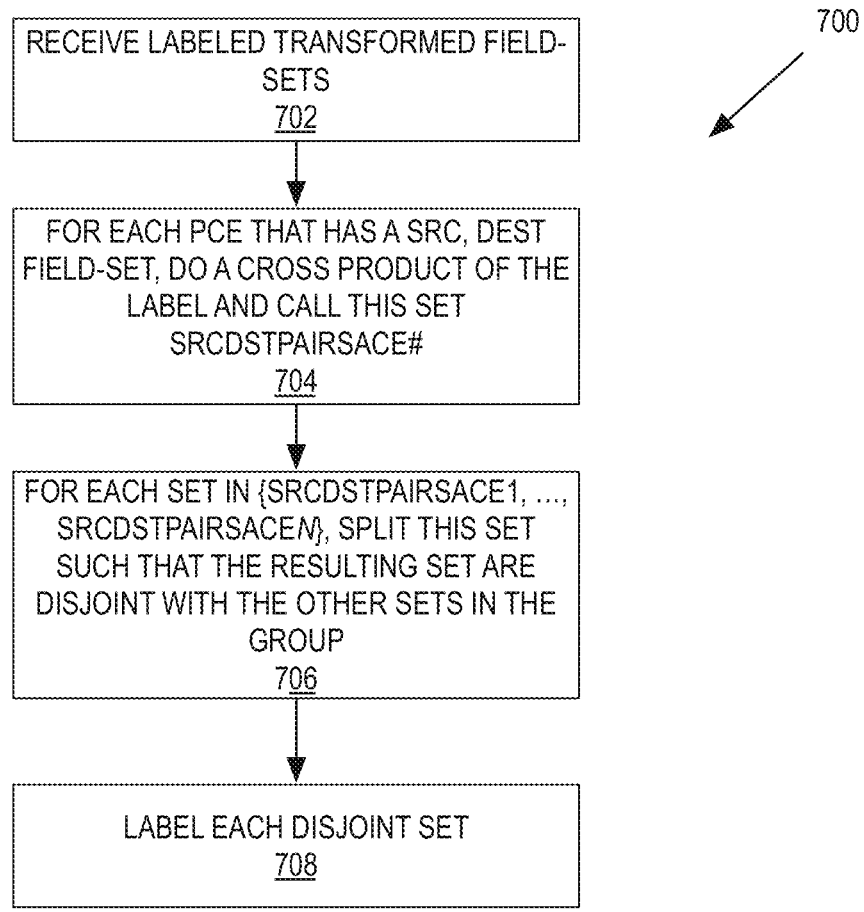
FIG. 7 is a flow diagram of one embodiment of a process to transform the set of labels to sets of source-destination label pairs.

In one embodiment, however, doing a single level of transformation for the range sets of packet characteristics is not sufficient to scale down the cross product for efficient implementation. For example and in one embodiment, doing the single level of transformation may still result in millions of entries needed in a packet classification list lookup table for a data center network configuration. In one embodiment, another transformation is performed on the pairs of the labels generated in FIG. 6A above (e.g., source-destination addresses (e.g. IPv4 or IPv6), source-destination ports, and/or other combinations). FIG. 7 is a flow diagram of one embodiment of a process to transform the set of field labels to sets of source-destination combination labels. In one embodiment, process 700 is performed by process 500 at block 506 as described in FIG. 5 above. In FIG. 7, process 700 begins by receiving the labelled transformed range sets at block 702. In one embodiment, the labelled transformed range sets are the labelled transformed range sets that were generated in FIG. 6A above.

At block 704, for each packet classification entry that has a source and destination range set, process 700 does a cross-product of the field labels for the transformed range sets and designates this resulting set as SrcDstPairsPce #, where the # is a number designating the packet classification entry. In one embodiment, in block 704, by performing the cross-products for the packet classification entries, process 700 can generate a number of the SrcDstPairsPce #, such that there is a set {SrcDstPairsPce1, . . . , SrcDstPairsPceN}.

At block 706, process 700 takes this results set {SrcDstPairsPce1, . . . , SrcDstPairsPceN} and splits this this set such that the resulting sets are disjoint with the other sets in this resulting set. For example and in one embodiment, let {L1, L2} and {M1, M2} be the label set for source range set and destination range set respectively in say, PCE1. Let {L1, L4} and {M1, M4} be the label set for source range set and destination range set in PCE2. If process 700 did a straightforward cross-product, the resulting set of rules would be 2×2+2×2 rules. To reduce this, process 700 will split the cross-product of all source-destination pairs into these disjoint sets.

X1: {(L1, M1)}
X2: {(L1, M2), (L2, M1), (L2, M2)}
X3: {(L1, M4), (L4, M1), (L4, M4)}
X1, X2 will be in PCE1 representing the source-destination combination for PCE1
X1, X3 will be in PCE2 representing its source-destination combination for PCE2
This reduces the number of rules to 2+2, or 4 rules.

At block 708, process 700 allocates combination labels for the resulting disjoint sets. In one embodiment, the cross-product of source-destination pairs with other fields in the PCE (e.g., the DSCP list, TCP/UDP designation, or another source-destination pairs where there is both prefix and port source-destination pairs in the PCE) can be further reduced by doing the following:

Let G={X1, X2, . . . , Xn} be the group of disjoint sets for which combination labels need to be allocated
A subset of G is associated with each PCE. These PCEs can be represented by A1, A2, . . . , Am for m PCEs. For example A1={X2, X3, Xn}, A2={ }
While there are unlabeled disjoint sets (Xn) do the following:
Let Amax be the set with highest cardinality in A1 . . . Am
Allocate combination labels for the disjoint sets in Amax
Remove the labelled disjoint sets from A1 . . . Am
Once the disjoint sets in G are labelled, for each PCE run an order-independent-merge on the set of labels used by the PCE. This can be done by representing the labels with a binary decision diagram to identify redundant bits that can be masked. For example, if the label set is {b'011, b'101, b'111} the result of the merge will yield {b'X11, b'101}.

Alternatively, the combination labels can be allocated in a different fashion. Assuming that the label is 16 bits, Let G={X1, X2, . . . , Xn} be the group of disjoint sets for which labels need to be allocated
A subset of G is associated with each PCE. Let's represent that by A1, A2, . . . , Am for m PCEs. For example A1={X2, X3, Xn}, A2={ }
Sort A1, A2, . . . , Am based on the cardinality
Iterate the sorted PCEs from highest cardinality
For each PCE, iterate the unlabeled sets in a chunk size of 16 sets or less if the total unlabeled sets are less
For the sets in the same chunk, allocate the label with last 4 bits masked out, e.g. b'10XXXX Each PCE may have multiple masked labels, either because it contains more than 16 disjoint sets, or it contains sets already allocated masked label in earlier PCE.

In this embodiment, this algorithm can reduce the number of rules from 200K (without any special encoding) to 15K. In addition, A chunk size of 16 allows for 4K unique masked labels, with still good space improvement. In one embodiment, a data center's packet classification list configuration can be reduced from millions of entries down to approximately 2500 disjoint set combination labels.

Figure 8:
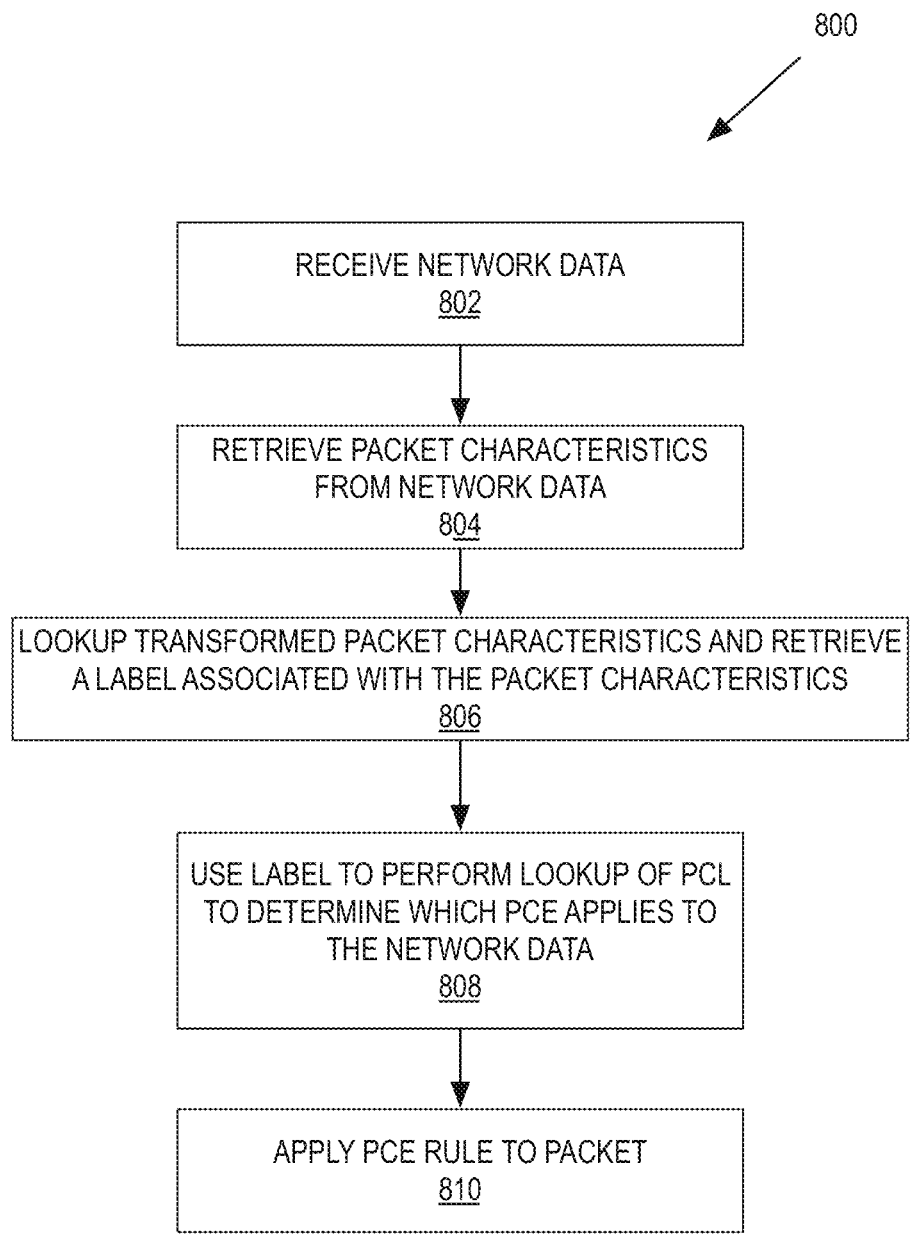
FIG. 8 is a flow diagram of one embodiment of a process to process network data using the source-destination label pairs.

With the lookup tables setup using the labeled packet characteristic pairs, the network element can use these lookup tables to determine if network data is subject to one of the rules in the packet classification list. FIG. 8 is a flow diagram of one embodiment of a process to process network data using the source-destination combination label pairs. In one embodiment, process 800 is performed by process 500 at block 510 in FIG. 5 described above. In FIG. 8, process 800 begins by receiving the network data at block 802. In one embodiment, the network data is a packet, such as a TCP/IP, UDP/IP, or another type of packet. At block 804, process retrieves the packet characteristics from the network data. In this embodiment, the packet characteristics can be the types of packet characteristics used in the packet classification list lookup table (e.g., source address, destination address, source port, destination port, DSCP bit, TCP/UDP designation, and/or other types of packet characteristics).

Process 800 looks up the transformed packet characteristics at block 806. In one embodiment, process 800 creates a key from the packet characteristics and this key is used in a lookup to get the label associated with the packet characteristics. For example and in one embodiment, the key can be a 34-bit key, where 1 bit indicates whether the key is for a prefix or a port, another bit is used to indicate the prefix is IPv4 or IPv6, 16 bits are used for the transformed source prefix or port, and another 16 bits are used for the transformed destination prefix or port. In one embodiment, with this key, process 800 performs a lookup to retrieve the combination label. In one embodiment, the combination label is a 16-bit label. In one embodiment, process 800 can perform more than one lookup. In this embodiment, process 800 performs a lookup for the transformed source-destination addresses and another lookup for the transformed source-destination ports.

At block 808, process 800 uses the retrieved combination label(s) for the packet characteristics to perform a lookup of the transformed packet classification list to determine which packet classification entry applies to the network data. In one embodiment, process 800 uses the prefix label, the port label, protocol, DSCP label, time-to-live (TTL) flag, TCP flags, and header fragment flag to perform a lookup in the packet classification list lookup table. Using this information, process 800 performs the packet classification list table lookup and determines which packet classification entry that applies to the network data. Process 800 applies the packet classification entry rule at block 810.

Figure 9:
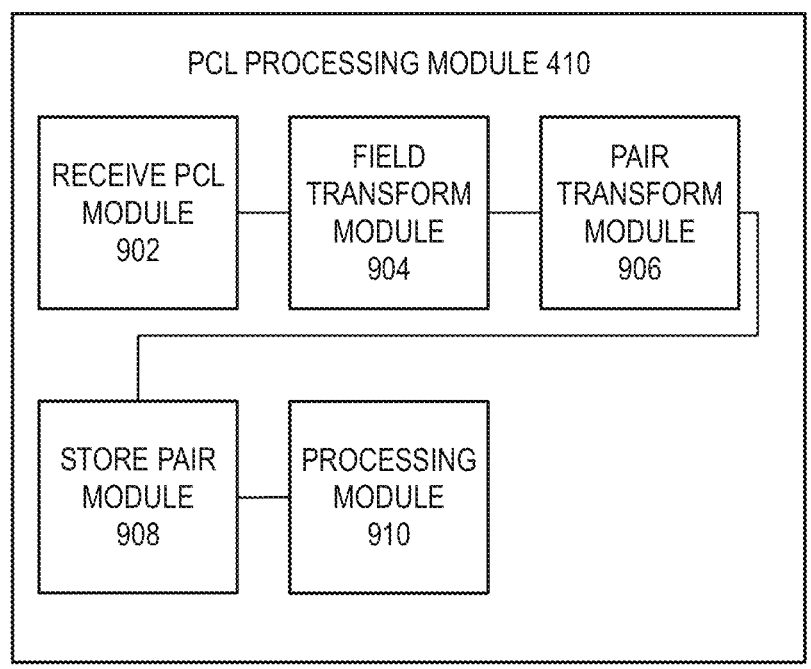
FIG. 9 is a block diagram of one embodiment of an ACL processing module that transforms a packet classification list to sets of source-destination label pairs that is used to process received network data.

FIG. 9 is a block diagram of one embodiment of a packet classification list processing module 410 that transforms packet classification list to sets of source-destination label pairs that is used to process received network data. In one embodiment, the packet classification list processing module 410 includes a receive packet classification list module 902, field transform module 904, pair transform module 906, store pair module 908, and processing module 910. In one embodiment, the receive packet classification list module 902 receives the packet classification list as described in FIG. 5, block 502 above. The field transform module 904 transforms the range sets as described in FIG. 5, block 504 above. The pair transform module 906 transforms the transformed range sets into labeled pairs as described in FIG. 5, block 506 above. The store pair module 908 stores the labeled pairs as described in FIG. 5, block 508 above. The processing module 910 processes the network data using the labeled pairs as described in FIG. 5, block 510 above.

Figure 10:
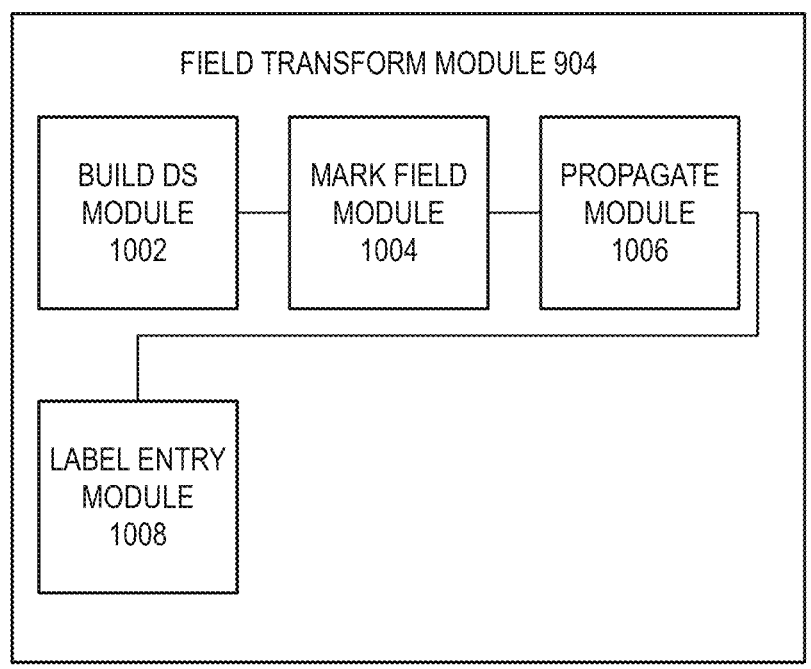
FIG. 10 is a block diagram of one embodiment of a prefix transform module that transforms range sets in the packet classification list to a set of labels for each packet characteristic in the packet classification list.

FIG. 10 is a block diagram of one embodiment of a prefix transform module 904 that transforms range sets in the packet classification list to a set of labels for each packet characteristic in the field. In one embodiment, the field transform module 904 includes build data structure module 1002, mark field module 1004, propagate module 1006, and label entry module 1008. In one embodiment, the build data structure module 1002 builds the data structure as described in FIG. 6A, block 602 above. The mark prefix module 1004 marks the range sets as described in FIG. 6A, block 608 above. The propagate module 1006 propagates the prefixes as described in FIG. 6A, block 610 above. The label entry module 1008 labels the entries in the data structure as described in FIG. 6A, block 612 above.

Figure 11:
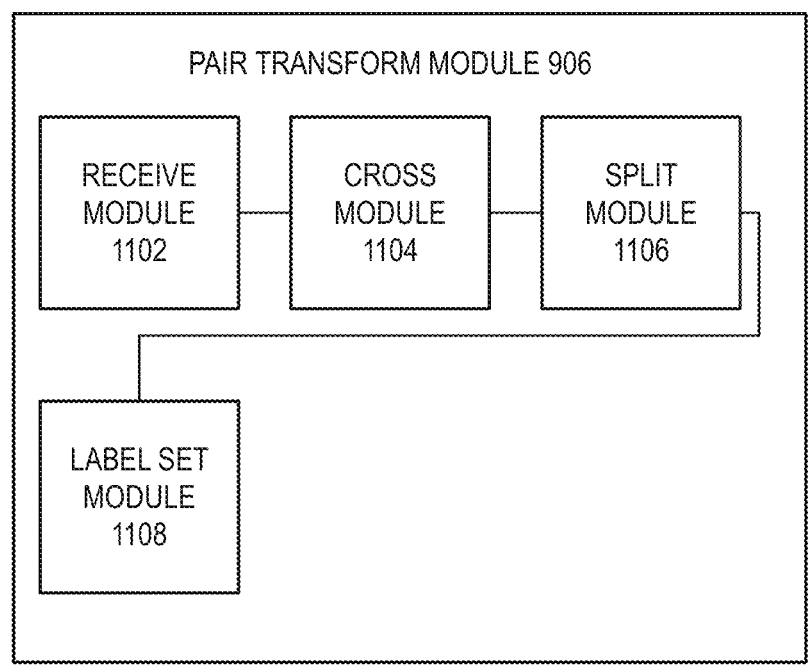
FIG. 11 is a block diagram of one embodiment of a pair transform module that transforms the set of labels to sets of source-destination label pairs.

FIG. 11 is a block diagram of one embodiment of a pair transform module 906 that transforms the set of labels to sets of source-destination label pairs. In one embodiment, the pair transform module 906 includes a receive module 1102, cross module 1104, split module 1106, and label set module 1108. In one embodiment, the receive module 1102 receives the transformed range sets as described in FIG. 7, block 702 above. The cross module 1104 creates the cross product as described in FIG. 7, block 704 above. The split module 1106 splits the sets into disjoint sets as described in FIG. 7, block 706 above. The label set module 1108 labels the disjoint sets as described in FIG. 7, block 708 above.

Figure 12:
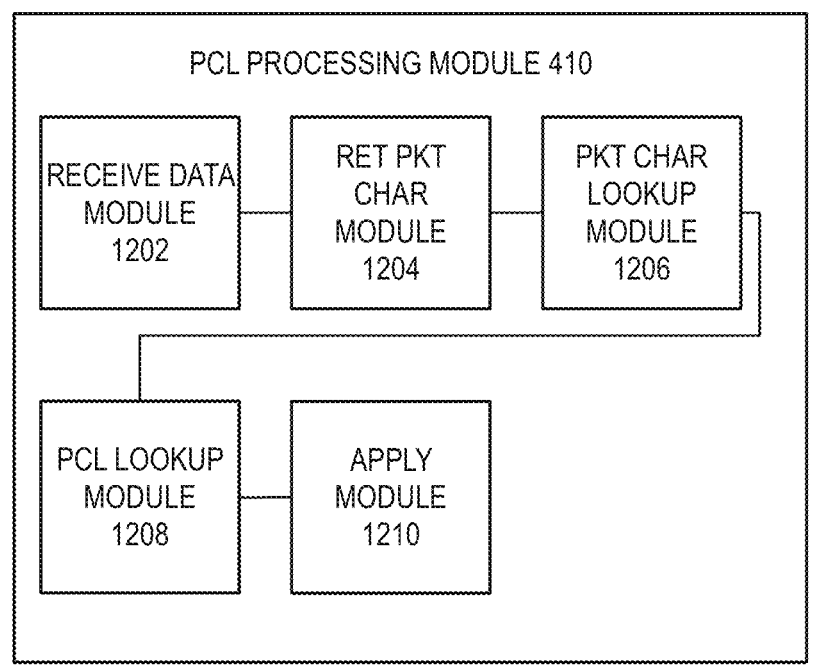
FIG. 12 is a block diagram of one embodiment of a processing module that processes network data using the source-destination label pairs.

FIG. 12 is a block diagram of one embodiment of a processing module 910 that process network data using the source-destination label pairs. In one embodiment, the processing module 910 includes a receive data module 1202, retrieve packet characteristics module 1204, packet characteristics lookup module 1206, packet classification list lookup module 1208, and apply module 1210. In one embodiment, the receive data module 1202 receives the network data as described in FIG. 8, block 802 above. The retrieve packet characteristics module 1204 retrieves the packet characteristics from the network data as described in FIG. 8, block 804 above. The packet characteristics lookup module 1206 looks up the packet characteristics as described in FIG. 8, block 806 above. The packet classification list lookup module 1208 looks up the packet classification list for the network data as described in FIG. 8, block 808 above. The apply module 1210 applies the rule of the packet classification entry corresponding to the network data as described in FIG. 8, block 810 above.

Exemplary Data Processing System and Modular Network Element

Figure 13:
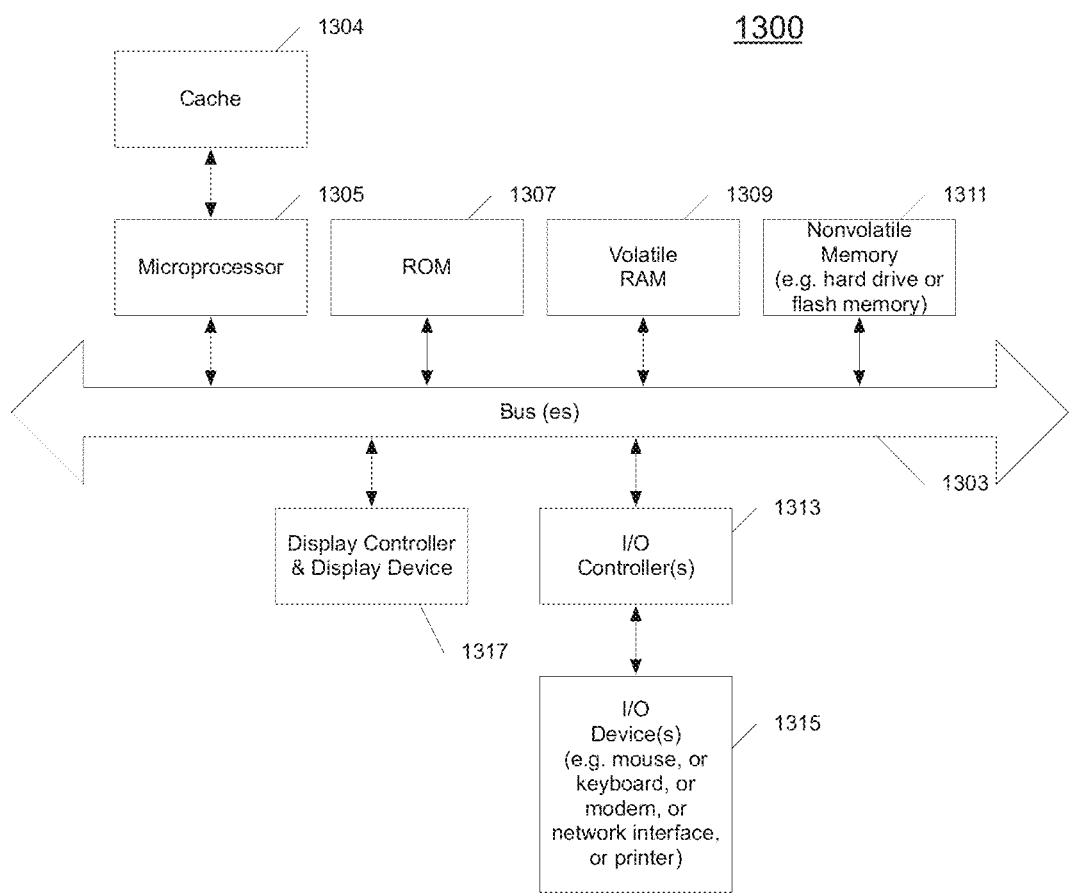
FIG. 13 shows one example of a data processing system that may be used with one embodiment.

FIG. 13 shows one example of a data processing system 1300 that may be used with one embodiment. For example, the data processing system 1300 may be implemented within any one of the network elements described herein, including network element 100 as in FIG. 1. In one embodiment, the data processing system 1300 is used within the control plane of a network element described herein. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1300 includes one or more bus(es) 1303 which couple to one or more microprocessor(s) 1305, ROM (Read Only Memory) 1307, volatile RAM 1309 and a non-volatile memory 1311. In one embodiment, the one or more microprocessor(s) 1305 couple to a cache 1304, which can include one or more sets of instruction and/or data caches. The bus(es) 1303 may include one or more buses connected to each other through various bridges, controllers and/or adapters as is well known in the art.

The microprocessor(s) 1305 may retrieve the instructions from the memories 1307, 1309, 1311 and execute the instructions to perform operations described above. Instructions and/or associated data retrieved from the memories 1307, 1309, 1311 may be stored in the cache 1304. The bus(es) 1303 interconnect system components with each other, and to a display controller and display device 1313, and to peripheral devices such as input/output (I/O) devices, which may be mice, keyboards, modems, network interfaces, printers and other devices well known in the art. Typically, the input/output devices 1315 are coupled to the system via input/output controller(s) 1317. The volatile RAM (Random Access Memory) 1309 is typically implemented as dynamic RAM (DRAM), which requires power continually in order to refresh or maintain the data in the memory, but may also include static ram (SRAM), which does not require a periodic refresh.

In one embodiment, the non-volatile memory 1311 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1311 will also be a random access memory although this is not required. While FIG. 13 shows that the non-volatile memory 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, static random access memory, dynamic random access memory, optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link such as a network connection).

Figure 14:
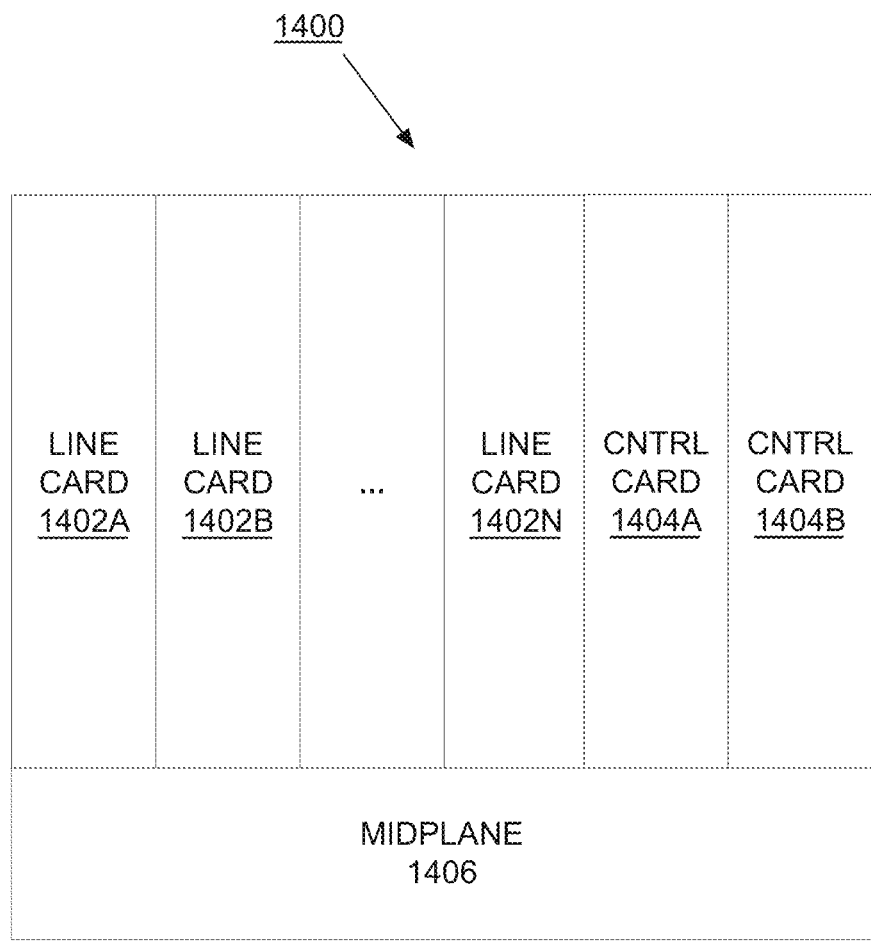
FIG. 14 is a block diagram of a modular network element, according to an embodiment.

FIG. 14 is a block diagram of a modular network element 1400, according to an embodiment. In one embodiment, the network element has a modular and expandable configuration that allows the addition or removal of resources configured as line cards 1402A-N, or controller cards 1404A-B coupled to a midplane 1406. In one embodiment, the controller cards 1404A-B control the processing of the traffic by the line cards 1402A-N, which can each include one or more network data forwarding devices such as interfaces 146A-C as in FIG. 1, although the precise nature of the forwarding devices is not limited as such. In addition, the controller card 1404A-B can transform a packet classification list as described in the FIGS. 5-7 above. In one embodiment, the line cards 1402A-N process and forward traffic according to the network policies received from controller cards the 1404A-B. In one embodiment, one or more of the line cards 1402A-N can process network data using the transform packet classification list as described in FIG. 8 above. It should be understood that the architecture of the modular network element 1400 illustrated in FIG. 14 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transforming," "receiving," "determining," "creating," "storing," "forwarding," "detecting," "processing," "marking," "communicating," "applying," "propagating," "labeling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A non-transitory machine-readable medium having executable instructions to cause one or more processing units to perform operations to process network data using a transformed packet classification list, the operations comprising:
   receiving a packet classification list that includes a plurality of range sets for two or more types of packet characteristics, wherein each of the plurality of range sets is a set of one or more numerical ranges for a packet characteristic;
   transforming a first set of the plurality of range sets corresponding to a first one of the two or more types of packet characteristics into a first set of range labels;
   transforming a second set of the plurality of range sets corresponding to a second one of the two or more types of packet characteristics into a second set of range labels;
   creating a set of combination labels from the first and second set of range labels, wherein each of the combination labels in the set of combination labels is derived from one of the range labels in the first set of range labels and one of the range labels in the second set of range labels], including:
     computing a cross-product between the first set of range labels and the second set of range labels;
     identifying a plurality of disjoint sets from results of the cross-product computation;
     identifying subsets of the plurality of disjoint sets that correspond to rules in the packet classification; and
     labelling the subsets of the plurality of the disjoint sets with the set of combination labels;
   storing the set of combination labels in a first lookup table, wherein each of the entries in the first lookup table includes one of the first range labels, one of the second range labels and a resulting combination label; and
   processing network data by,
     performing a first lookup in the first lookup table to derive a first combination packet label,
     performing a second lookup of at least the first combination packet label in a second lookup table, and
     applying a rule resulting from the second lookup to the network data.

2. The non-transitory machine-readable medium of claim 1, wherein the receiving of the packet classification list comprises:
   receiving a user configuration; and
   transforming that user configuration into a set of rules and the plurality of range sets, wherein each range in the plurality of range sets is associated with a rule from the set of rules.

3. The non-transitory machine-readable medium of claim 1, further comprising:
   transforming one of the plurality of range sets into a new range set that includes non-overlapping ranges by splitting a member range of the one of the plurality of ranges into two or more non-overlapping ranges.

4. The non-transitory machine-readable medium of claim 1, wherein
   a first label associated with a first type of packet characteristic is associated with a first set of rules, and a second label associated with a second type of packet characteristic is associated with the first set of rules, a third label associated with the first type of packet characteristic is associated with a second set of rules, and a fourth label associated with the second type of packet characteristic is also associated with the second set of rules, and wherein a first combination label derived from a combination of the first label and the second label is equal to a second combination label derived from a combination of the third label and the fourth label.

5. The non-transitory machine-readable medium of claim 1, wherein the transformation to one or more of the first and second set of range labels comprises:
associating with a first range, an indication of a subset of a set of rules that the first range belongs to.

6. The non-transitory machine-readable medium of claim 1, wherein a second range of a first range set of the plurality of range sets is nested within a first range of the first range set, and an indication of the rules that the second range belongs to includes a subset of a set of rules that the first range belongs to.

7. The non-transitory machine-readable medium of claim 1, wherein one of the plurality of range sets includes an except element that subtracts a numerical range of the packet characteristic from that range-set.

8. The non-transitory machine-readable medium of claim 1, wherein a a range set in the first set of the plurality of range sets includes a numerical range that is designated an excluded range.

9. The non-transitory machine-readable medium of claim 1, further comprising:
matching a rule with one of the combination labels in the set of combination labels when another one of the combination labels in the set of combination labels is a possible match.

10. The non-transitory machine-readable medium of claim 1, wherein one of the plurality of range sets is associated with multiple range labels.

11. The non-transitory machine-readable medium of claim 1, wherein one of the plurality of range sets is associated with multiple combination labels.

12. A method to process network data using a transformed packet classification list, the method comprising:
receiving a packet classification list that includes a plurality of range sets for two or more types of packet characteristics, wherein each of the plurality of range sets is set of one or more numerical ranges for a packet characteristic;
transforming a first set of the plurality of range sets corresponding to a first one of the two or more types of packet characteristics into a first set of range labels;
transforming a second set of the plurality of range sets corresponding to a first one of the two or more types of packet characteristics into a second set of range labels;
creating a set of combination labels from the first and second set of range labels, wherein each of the combination labels in the set of combination labels is derived from one of the range labels in the first set of range labels and one of the range labels in the second set of range labels, including:
computing a cross-product between the first set of range labels and the second set of range labels;
identifying a plurality of disjoint sets from results of the cross-product computation;
identifying subsets of the plurality of disjoint sets that correspond to rules in the packet classification; and
labelling the subsets of the plurality of the disjoint sets with the set of combination labels;
storing the set of combination labels in a first lookup table, herein each of the entries in the first lookup table includes one of the first range labels, one of the second range labels and a resulting combination label; and
processing network data by,
performing a first lookup in the first lookup table to derive a first combination packet label
performing a second lookup of at least the first combination packet label in a second lookup table, and
applying a rule resulting from the second lookup to the network data.

13. The method of claim 12, wherein the receiving of the packet classification list comprises:
receiving a user configuration; and
transforming that user configuration into a set of rules and the plurality of range sets, wherein each range in the plurality of range sets is associated with a rule from the set of rules.

14. The method of claim 12, further comprising:
transforming one of the plurality of range sets into a new range set that includes non-overlapping ranges by splitting a member range of the one of the plurality of ranges into two or more non-overlapping ranges.

15. The method of claim 12, wherein
a first label associated with a first type of packet characteristic is associated with a first set of rules, and a second label associated with a second type of packet characteristic is associated with the first set of rules,
a third label associated with the first type of packet characteristic is associated with a second set of rules, and a fourth label associated with the second type of packet characteristic is also associated with the second set of rules, and
wherein a first combination label derived from a combination of the first label and the second label is equal to a second combination label derived from a combination of the third label and the fourth label.

16. The method of claim 12, wherein the transformation to one or more of the first and second set of range labels comprises:
associating with a first range, an indication of a subset of a set of rules that that the first range belongs to.

17. The method of claim 12, wherein a second range of a first range set of the plurality of range sets is nested within a first range of the first range set, and an indication of the rules that the second range belongs to includes a subset of a set of rules that the first range belongs to.

18. The method of claim 12, further comprising:
matching a rule with one of the combination labels in the set of combination labels when another one of the combination labels in the set of combination labels is a possible match.

* * * * *